(12) United States Patent
Chatterjee et al.

(10) Patent No.: US 9,471,883 B2
(45) Date of Patent: Oct. 18, 2016

(54) HYBRID HUMAN MACHINE LEARNING SYSTEM AND METHOD

(71) Applicant: METAVANA, INC., Menlo Park, CA (US)

(72) Inventors: Manjirnath Chatterjee, San Francisco, CA (US); Rabia Turan, Redwood Shores, CA (US); Brian Lue, Mountain View, CA (US); Ankur Agrawal, Sunnyvale, CA (US); Kevin Perillo, San Jose, CA (US)

(73) Assignee: MOODWIRE, INC., Menlo Park, CA (US)

( * ) Notice: Subject to any disclaimer, the term of this patent is extended or adjusted under 35 U.S.C. 154(b) by 311 days.

(21) Appl. No.: 14/274,567

(22) Filed: May 9, 2014

(65) Prior Publication Data

US 2014/0337257 A1    Nov. 13, 2014

Related U.S. Application Data

(60) Provisional application No. 61/821,487, filed on May 9, 2013.

(51) Int. Cl.
G06F 15/18    (2006.01)
G06N 99/00    (2010.01)
G06F 17/30    (2006.01)

(52) U.S. Cl.
CPC ....... *G06N 99/005* (2013.01); *G06F 17/30011* (2013.01)

(58) Field of Classification Search
CPC combination set(s) only.
See application file for complete search history.

(56) References Cited

U.S. PATENT DOCUMENTS 7,860,825 B2 * 12/2010 Chatterjee ......... G06F 17/30194
705/51
8,108,612 B2 * 1/2012 Xun .................. G06F 17/30949
711/129

(Continued)

OTHER PUBLICATIONS

Sentiment Categorization on a Creole Language with Lexicon-Based and Machine Learning Techniques Adolfo A. Ríos; Pedro J. Amarilla; Gustavo A. Giménez Lugo Intelligent Systems (BRACIS), 2014 Brazilian Conference on Year: 2014 pp. 37-43, DOI: 10.1109/BRACIS.2014.18 IEEE Conference Publications.*

(Continued)

*Primary Examiner* — Michael B Holmes
(74) *Attorney, Agent, or Firm* — Peter Su; Dentons US LLP

(57) ABSTRACT

Embodiments of the present invention provide a system, method, and article of hybrid human machine learning system with tagging and scoring techniques for sentiment magnitude scoring of textual passages. The combination of machine learning systems with data from human pooled language extraction techniques enable the present system to achieve high accuracy of human sentiment measurement and textual categorization of raw text, blog posts, and social media streams. This information can then be aggregated to provide brand and product strength analysis. A data processing module is configured to get streaming data and then tag the streaming data automatically using the machine learning output. A crowdsourcing module is configured to select a subset of social media posts that have been previously stored in the database, and present the social media posts on the web, which then tags each social media with a selected set of attributes. A score aggregator module configured to provide a score based on a user's feedback for each social media post.

20 Claims, 19 Drawing Sheets

(56) References Cited

U.S. PATENT DOCUMENTS

| | | | | |
|---|---|---|---|---|
| 8,321,556 | B1* | 11/2012 | Chatterjee | H04L 12/44 455/2.01 |
| 8,458,612 | B2* | 6/2013 | Chatterjee | G06F 3/04817 715/738 |
| 8,478,299 | B2* | 7/2013 | Chatterjee | G01S 1/68 455/434 |
| 8,484,417 | B2* | 7/2013 | Xun | G06F 17/30949 711/129 |
| 8,503,991 | B2* | 8/2013 | Swift | H04L 12/2602 455/115.1 |
| 8,527,688 | B2* | 9/2013 | Chatterjee | G06F 1/26 336/221 |
| 8,850,045 | B2* | 9/2014 | Berg | H04L 63/08 709/225 |
| 8,868,939 | B2* | 10/2014 | Matsuoka | G06F 1/1632 320/107 |
| 8,948,692 | B2* | 2/2015 | Berg | H04B 5/0031 455/41.1 |
| 9,203,642 | B2* | 12/2015 | Chatterjee | H04L 12/44 |
| 9,213,997 | B2* | 12/2015 | Chatterjee | G06Q 10/107 |

OTHER PUBLICATIONS

Bifurcation and Chaos Analysis of a Relative Short Spherical Air Bearing System via a Novel Hybrid Method Cheng-Chi Wang; Her-Terng Yau; Chao-Lin Kuo Chaos-Fractals Theories and Applications, 2009. IWCFTA '09. International Workshop on Year: 2009 pp. 327-330, DOI: 10.1109/IWCFTA.2009.75 IEEE Conference Publications.*

A Hybrid Sentiment Analysis Framework for Large Email Data Sisi Liu; Ickjai Lee Intelligent Systems and Knowledge Engineering (ISKE), 2015 10th International Conference on Year: 2015 pp. 324-330, DOI: 10.1109/ISKE.2015.91 IEEE Conference Publications.*

Sentiment Analysis and Summarization of Twitter Data Seyed-Ali Bahrainian; Andreas Dengel Computational Science and Engineering (CSE), 2013 IEEE 16th International Conference on Year: 2013 pp. 227-234, DOI: 10.1109/CSE.2013.44 IEEE Conference Publications.*

* cited by examiner

Tagvana
Dashboard

Ang Lue (Edit profile)

| Balance: | $0.33 |
|---|---|
| Paid to Date: | $0.00 |
| Last Payment: | $0.00 |
| Questions Answered to Date: | 13 |

Available Surveys

| Name | $US per Question | | |
|---|---|---|---|
| banks | 0.03 | | |
| airlines | 0.02 | | |
| printers | 0.02 | | |

Payment History

| Name | Questions Answered | $/Question | Total Earned | Survey Status | Paid | Payment Time |
|---|---|---|---|---|---|---|
| banks | 7 | 0.030 | $0.21 | ACTIVE | No | |
| airlines | 4 | 0.020 | $0.08 | ACTIVE | No | |
| printers | 2 | 0.020 | $0.04 | ACTIVE | No | |

Feedback About Help Logout

FIG. 15

Tagvana

Dashboard >> Survey

Feedback  About  Help  Log out

Vertical: Printers-qa

| Questions | Polarity | | | | | | Tags | |
|---|---|---|---|---|---|---|---|---|
| | -2 | -1 | 0 | +1 | +2 | Mixed | ? Not Scored | Spam Chaff |
| A Great Printer for Home Office | ○ | ○ | ○ | ○ | ○ | ○ | ⦿ Not Scored | ☐ Spam ☐ Chaff |
| HP Officejet Pro 8600 eAllinOne Review from HP customer.. | ○ | ○ | ○ | ○ | ○ | ○ | ⦿ Not Scored | ☐ Spam ☐ Chaff |
| I recently purchased the HP 8600 Pro Premium to replace a 7680 that was still performing quite well. | ○ | ○ | ○ | ○ | ○ | ○ | ⦿ Not Scored | ☐ Spam ☐ Chaff |
| Set-up was very easy, just follow the set up sheet. | ○ | ○ | ○ | ○ | ○ | ○ | ⦿ Not Scored | ☐ Spam ☐ Chaff |
| Acquiring the wireless signal was error free and the printer is meeting every expectation that I had for it. | ○ | ○ | ○ | ○ | ○ | ○ | ⦿ Not Scored | ☐ Spam ☐ Chaff |
| I had it printing in less than 30 minutes. | ○ | ○ | ○ | ○ | ○ | ○ | ⦿ Not Scored | ☐ Spam ☐ Chaff |
| Customer service was superb in exchanging a new but no longer needed XL cartridge for the 7680. | ○ | ○ | ○ | ○ | ○ | ○ | ⦿ Not Scored | ☐ Spam ☐ Chaff |
| You can beat the service and products that HP provides. | ○ | ○ | ○ | ○ | ○ | ○ | ⦿ Not Scored | ☐ Spam ☐ Chaff |
| Thanks!! | ○ | ○ | ○ | ○ | ○ | ○ | ⦿ Not Scored | ☐ Spam ☐ Chaff |

Submit

Tagvana

Dashboard >> Survey

Description for "Cosmetics" vertical:
Select the appropriate polarity and tag for each phrase.

| Phrases | Polarity and Tags |
|---|---|
| Great Color! | -2  -1  0  +1  ⊛+2  ○?  ○NS  □Spam □Chaff |
| I have a caramel complexion. | ○-2  ○-1  ⊛0  ○+1  ○+2  ○?  ○NS  □Spam □Chaff |
| However, Deep Throat is AMAZING! | ○-2  ○-1  ○0  ○+1  ⊛+2  ○?  ○NS  □Spam □Chaff |
| I use it year round and have received | ○-2  ○-1  ○0  ○+1  ⊛+2  ○?  ○NS  □Spam □Chaff |
| compliments on it as well. | ○-2  ○-1  ○0  ○+1  ⊛+2  ○?  ○NS  □Spam □Chaff |
| I am going to venture out and try Desire, Taj Mahal, and Exhibit A next. | ○-2  ○-1  ○0  ○+1  ⊛+2  ○?  ○NS  □Spam □Chaff |
| Great Stuff! | ○-2  ○-1  ○0  ○+1  ⊛+2  ○?  ○NS  □Spam □Chaff |
| Def. | ○-2  ○-1  ○0  ○+1  ○+2  ⊛?  ○NS  □Spam ☑Chaff |
| one of my favorite Blushes! | ○-2  ○-1  ○0  ○+1  ⊛+2  ○?  ○NS  □Spam □Chaff |

FIG. 18

What is the polarity of the below sentence? If sentiment bearing, please check the sentiment bearing phrases in the sentence.

Orange  telecom  sucks        -2 -1  0 +1 +2
  ☐       ☐      [X]            ●  ●  ●  ●  ●

Is there an entity in here? If yes please check the boxes under the words that is part of the entity.

Orange  telecom  sucks        Yes No NS
 [X]     [X]      ☐            ●   ●  ●

FIG. 19

HYBRID HUMAN MACHINE LEARNING SYSTEM AND METHOD

CROSS REFERENCES TO RELATED PATENT APPLICATIONS

This application claims priority to U.S. Provisional Application Ser. No. 61/821,487 entitled "Hybrid Human Machine Learning System," filed on 9 May 2013, the disclosure of which is incorporated herein by reference in its entirety.

FIELD OF THE INVENTION

The present invention relates generally to the field of text analytics and, more particularly, to automation machine learning systems of social media posts with methodologies in tagging and scoring for sentiment magnitude scoring of textual passages.

BACKGROUND

The World Wide Web (WWW), or simply the "Web", is the well-known collection of interlinked hypertext documents hosted at a vast number of computer resources ("hosts") that are communicatively coupled to one another over networks of computer networks known as the Internet. These documents, which may include text, multimedia files and images, are typically viewed as Web pages with the aid of a Web browser, which is a software application running on a user's computer system. Collections of related Web pages that can be addressed relative to a common uniform resource locator (URL) are known as websites and are typically hosted on one or more Web servers accessible via the Internet.

Websites featuring User Generated Content (UGC), which is content created and posted to websites by owners of and, sometimes, visitors to those sites, have become increasingly popular. There are UGC accounts for a wide variety of content, including news, gossip, audio-video productions, photography, and social commentary, to name a few. Of interest to the present inventors is UGC, which expresses opinions (usually, but not necessarily, of the person posting the UGC), for example of products, services, or combinations thereof (herein, the term "product" refers to any or all such products and/or services). Social media sites in particular have become popular places for users of those sites to post UGC that includes opinion information.

The opinions and commentary posted to social media sites have become highly influential and many people now make purchasing decisions based on such content. Unfortunately, for people seeking out such content in order to inform prospective purchasing decisions and the like, the task is not always easy. Blogs, micro-blogs, and social networking sites are replete with ever-changing content, and, even if one can locate a review or similar post of interest, such reviews typically include much information that is of little or no relevance to the topic and/or to the purpose for which the review is being read. Further, while the UGC and opinion information can be of great value to advertisers, retailers, and others, it is extremely burdensome to collect and analyze in any systematic way. It is even more difficult to extract therefrom meaningful commentary or opinions that can form the basis for appropriate responses or informed decisions.

Extracting sentiment from phrases, words or a combination of words continues to present challenges in text analytics, particularly when a given passage of text has multiple sentiment bearing phrases in different sentences. Within a passage of text, numerous sentiment bearing phrases can exist, and, within that passage, sentiment bearing phrases may be bound to different categories, which makes an accurate read on the overall sentiment of the entire passage more challenging. One approach is to look at the individual nugget in the passage, sentence by sentence, drawing little clues, like positive on a first nugget, positive on a second nugget, but negative on a third nugget. In total, the sum of these nuggets adds up to arrive at the summation of the overall sentiment.

Conventional solutions of text analytics requires methods of inputting training data into a computer database where supervised machine learning algorithms can access and process the training data. To increase the pace of training data, researchers have been using web browser based applications to interact with people and present training samples, so that they can tag associated descriptive information with the training samples. A widely used Web-based platform to load, present, and gather tagged information from people is Amazon's Mechanical Turk. In Amazon's Mechanical Turk, users log into the Web-based application and browse for jobs for them to process, and in return for their work, users are paid for a specific task, such as, categorizing text from a set of multiple-choice answers.

Accordingly, it is desirable to have a system and method that provide more effective ways for a hybrid human machine learning platform.

SUMMARY OF THE INVENTION

Embodiments of the present invention provide a system, method, and article of hybrid human machine learning system with tagging and scoring techniques for sentiment magnitude scoring of textual passages. The combination of machine learning systems with data from human pooled language extraction techniques enables the present system to achieve exceptionally high accuracy of human sentiment measurement and textual categorization of raw text, blog posts, and social media streams. This information can then be aggregated to provide brand and product strength analysis.

In one embodiment, a distributed computing environment (or a single computing environment) with a data processing module, a database module, a crowdsourcing module, a score aggregating module, and a machine learning module. The data processing module is configured to get streaming data and then tag the streaming data automatically using the machine learning output. The tagging of a streaming data message may be a topic or category of sentiment. After tagging the streaming data, the data processing module is configured to send the tagged streaming data to the database module. The database module is configured to save the tagged streaming data in the database. The crowdsourcing module is configured to select a subset of social media posts that have been previously stored in the database, and present the social media posts on the Web, which then tags each social media post with a selected set of attributes. Such attributes include spam or not spam, sentiment magnitude, category type, entity type and industry (also referred to as "vertical") type. The score aggregator module is configured to provide a score based on a user's feedback for each social media post. The machine learning module is configured to use the output from the score aggregator module and learns, adapts, or develops a model from the given data. The output from the machine learning module is used by the data processing module for tagging.

Broadly stated, a computer-implemented method for analyzing sentiment bearing documents in a hybrid system, comprising sampling a document from the database based according to a predetermined selection criteria; tagging each sample document from the sample documents, each document having one or more pieces of text; presenting each piece in the document to a group of humans, each human scoring a different attribute associated with an inquiry from the hybrid system; determining whether the responses from the group of humans for each attribute collectively meet a predetermined threshold; storing an aggregated score if there is a human agreement from the group of humans for a particular attribute; and providing an aggregated score as a feedback to a machine learning system for adaptive adjustment of a model associated with the machine learning system for automatic tagging of unsampled documents.

The structures and methods of the present invention are disclosed in the detailed description below. This summary does not purport to define the invention. The invention is defined by the claims. These and other embodiments, features, aspects, and advantages of the invention will become better understood with regard to the following description, appended list of claims, and accompanying drawings.

BRIEF DESCRIPTION OF THE DRAWINGS

The invention will be described with respect to specific embodiments thereof, and reference will be made to the drawings, in which:

FIGS. 15-19 are pictorial diagrams illustrating an exemplary dashboard on crowdsourcing (Tagvana) in accordance with the present invention.

DETAILED DESCRIPTION

Figure 1:
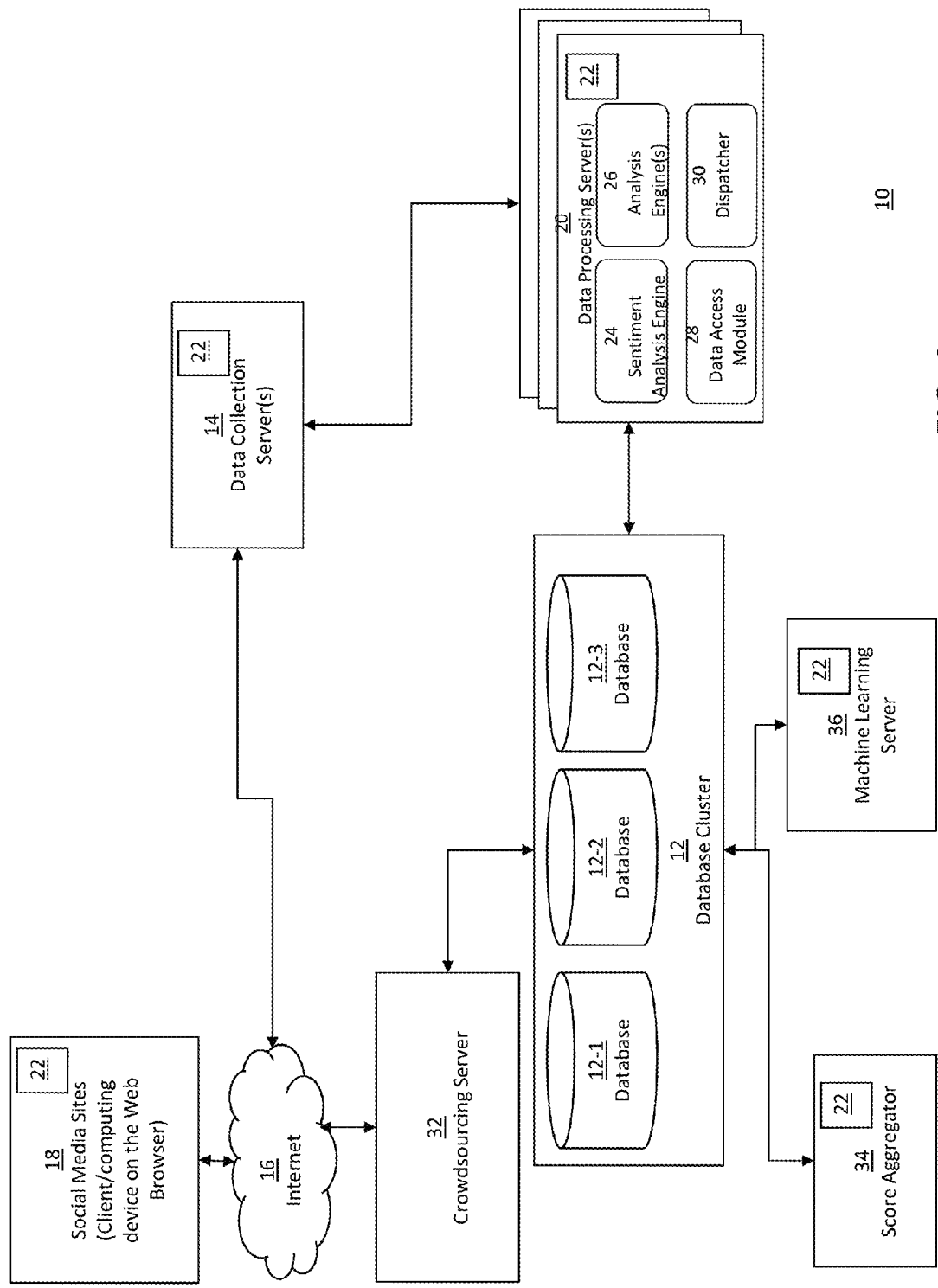
FIG. 1 is a system diagram illustrating one embodiment of a hybrid human machine learning system in a distributed computer environment in accordance with the present invention.

A description of structural embodiments and methods of the present invention is provided with reference to FIGS. 1-19. It is to be understood that there is no intention to limit the invention to the specifically disclosed embodiments but that the invention may be practiced using other features, elements, methods, and embodiments. Like elements in various embodiments are commonly referred to with like reference numerals. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

The following definitions may apply to some of the elements described with regard to some embodiments of the invention. These terms may likewise be expanded upon herein.

Cloud Computing—Internet-based computing network that involves the provision of dynamically scalable and often virtualized resources as a service over the Internet, such as iCloud®available from Apple Inc. of Cupertino, Calif., Amazon Web Services (IaaS) and Elastic Compute Cloud (EC2) available from Amazon.com, Inc. of Seattle, Wash., SaaS and PaaS available from Google Inc. of Mountain View, Calif., Microsoft Azure Service Platform (Paas) available from Microsoft Corporation of Redmond, Wash., Sun Open Cloud Platform available from Oracle Corporation of Redwood City, Calif., and other cloud computing service providers.

Electronic Message Sharing Systems—include Internet forums, electronic mailing lists, blogs and microblogs, and social networks.

Mobile Device—a portable device (including a smartphone iPhone, a mobile phone, a mobile device such as iPod, a tablet computer such as iPad, and a browser-based notebook computer such as Chromebook) with a processor, a memory, a screen, with connection capabilities of Wireless Local Area Network (WLAN), Wide Area Network (WAN), Wi-Fi, 2G, 3G, 4G and future generation data networks.

Mobile Operating System—the mobile device is configured with a full or partial operating system (OS) software, which provides a platform for running basic and advanced software applications. Software applications are available on Android, iPhone, BlackBerry, and Windows Phone platforms.

Social Media Data—a message (e.g., text message, instant message, Multimedia Messaging Service (MMS) message).

Social Networking—a social structure composed of individuals or organizations, which are also referred to as nodes, that are connected by one or more specific types of interdependency, such as friendship, professional profiles, financial exchange, common interest, kinship, relationships, beliefs, knowledge, prestige, dislike, or sexual relationships. Some current examples of social networking sites may include Facebook, LinkedIn, Twitter, Yelp, Orkut, Google's Social Circle, 腾讯 Tencent (www.qq.com), 新浪微博 Sina Weibo (www.weibo.com), Baidu, Inc. 百度 (www.baidu.com), 搜狐 (www.sohu.com), 人人网 (www.renren.com), Hyves, Nexopia, Skyrock, StudiVZ, and Tuenti.

Tweet—applies to any socially compact broadcasted form of expression which can apply to social networking and microblogging services including electronic messages, personal status updates, blog entries, micro-blogging posts (e.g., tweets and/or other status updates associated with Twitter, status updates associated with Google Buzz, status updates associated with Facebook, Sina Weibo feeds, Tencent WeChat feeds, etc.), news headlines, news articles, text, images, audio, video, links, and/or other content items. Languages supported include, but are not limited to, English, traditional/simplified Chinese, French, German, Italian, Spanish, Japanese, Korean, Indonesian, Thai, Vietnamese, Malay, Russian, Portuguese, Turkish, Polish, and Hindi.

Web Browser—a software application for retrieving, presenting, and traversing a Uniform Resource Identifier (URI) on the World Wide Web provided by web servers. Web browsers may include, but are not limited to, browsers running on personal computer operating systems and browsers running on mobile phone platforms. The first type of web browsers may include Microsoft's Internet Explorer, Apple's Safari, Google's Chrome, and Mozilla's Firefox. The second type of web browsers may include the iPhone OS, Google Android, Nokia S60, and Palm WebOS. Examples of a URI include a web page, an image, a video, or other type of content.

FIG. 1 is a system diagram illustrating one embodiment of a hybrid human machine learning system 10 in a distributed computer environment. Alternatively, the hybrid human machine learning system can be integrated into one computer system. The hybrid human machine learning system 10 includes two paths that shared a same database cluster 12, with databases 12-1, 12-2, and 12-3. In a first path, one or more data collection servers 14 collects social media posts (or stream data) from the Internet 16 through one or more social media sites 18. One or more data processing servers 20, coupled to the one or more data collection servers 14, processes data and tags the social media posts. Each of the one or more data processing services includes a computer 22, a sentiment analysis engine 24, analysis module(s) 26, a data access module 28, and a dispatcher 30. The results of the one or more data processing servers 20 are stored in the database cluster 12, such as tweets from Twitter that are saved in the database cluster 30 while normalizing each tweet. The normalization process is to make sure the input data is in consumable format by the data processing module and the crowdsourcing module. In a second path, a crowdsourcing (also referred to as "Tagvana") server 32 coupled to the Internet 16 sourcing a subset (or set) of data stream previously stored in the database cluster 12 by the one or more data processing servers 20 and tagging the subset (or set) of data stream based on the human comments in crowdsourcing. A score aggregator 34, coupled to the database cluster 12, retrieves the tagged data stream from the database cluster 12 and aggregates the scores using various techniques. A machine learning server 36, coupled to the score aggregator 34 and the database cluster 12, learns about the scored data from the score aggregator 34 and updates and stores the learned model in the database cluster 12.

Figure 2:
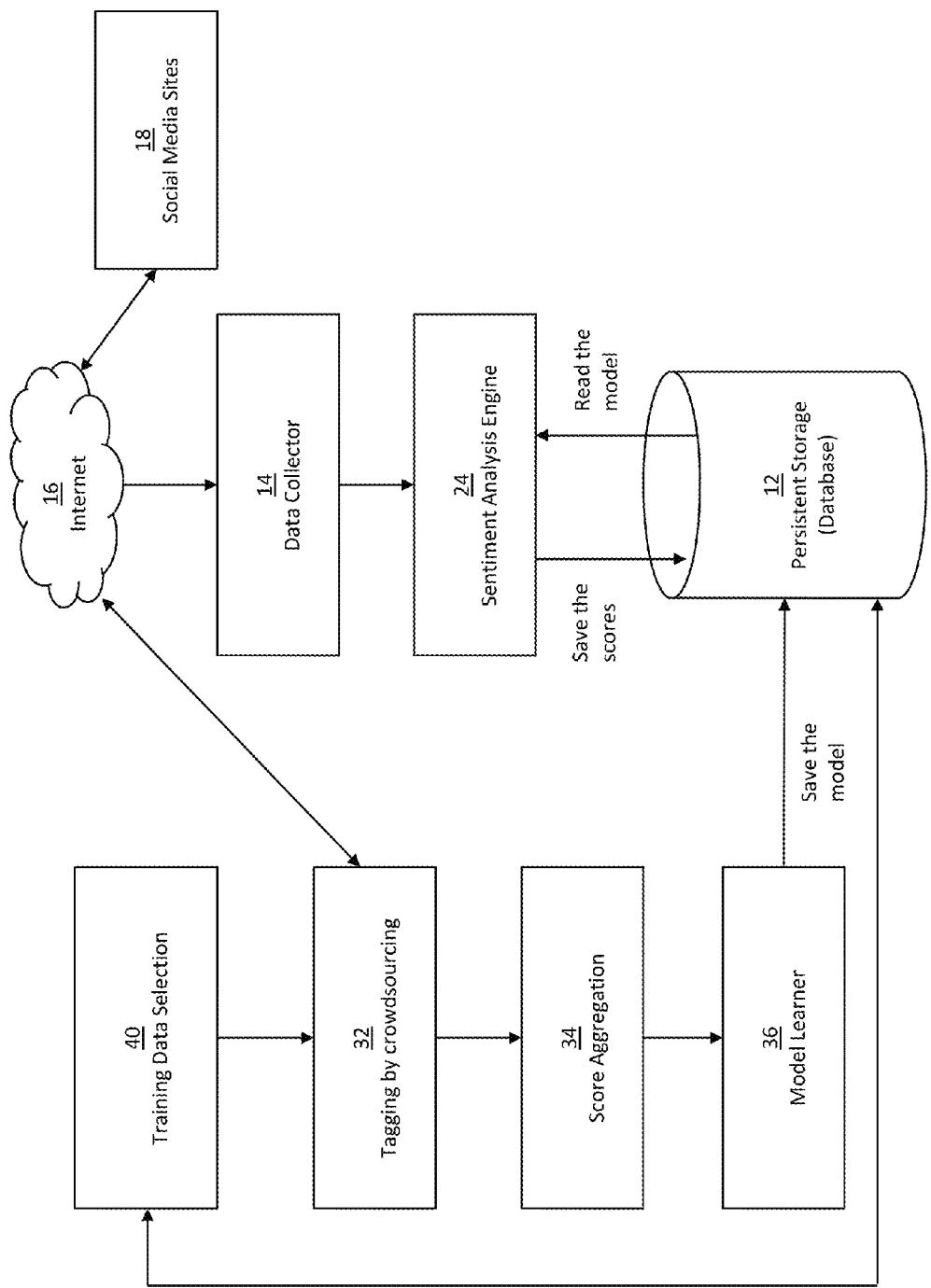
FIG. 2 is a flow diagram illustrating one embodiment on the process of a hybrid human machine learning system in accordance with the present invention.

FIG. 2 is a flow diagram 38 illustrating one embodiment on the process of a hybrid human machine learning system 10. After the training data has been selected at 40, each item of the training data is tagged by crowsourcing 32. Different types of scores are assigned to each tweet, where the aggregated scores 34 are summed up. Machine learning 36 of a model from score aggregation and crowdsourcing 34 is developed. The model learner 36 is then saved in the persistent storage (or database) 12.

Sentiment Analysis Engine

Text from reviews, Twitter tweets, social media, customer center call logs, speech-to-text output of phone conversations, and many sources can be analyzed to show several different aspects of a writer's emotional state relative to certain subject categories or specific brands or products. The sentiment analysis engine 24 is configured to parse and scan the writer's text and scores the attribution of emotional statements (sentiment) to specific items.

Each item the engine processes (a review, a tweet, comment etc.) provides 0 or more classifiable pieces of information from a sentiment measurement perspective. Each of these pieces is a scorable item. Each of the score items tells something about sentiment and about specific objects where an object can be a product, a brand, a person, etc. If human scoring is the starting point, it is feasible to reach agreement on how to score sentiment and categories.

Once this framework is established, a methodology on how scoring is developed, whereby scoring can be by either a human or a machine. Note that the sentiment scoring system is not perfect but only a baseline against which to perform relative comparisons. By deliberate simplification, the scoring system is automatable so that we can introduce straightforward methods to audit the engine results.

Sentiment Tagged Scoring System

Prior to sentiment being assessed in an automated fashion, text is examined to come to a common scoring methodology for humans to tag text passages. This allows the ability to both look at a passage and create a score empirically, and also to test against future engine algorithms objectively.

The key choices made here, which are handled differently in different scoring systems, are as follow:

Piece Level→Item Level→Stream level scoring. One embodiment of a simple scoring system is described, which encompasses basic sentiment measurement. Some of the limitations include:

No context scoring—piece level scores and item scores are each treated as separate and independent.

No relative scoring—e.g. apples are better than oranges→requires other techniques not currently in our methodological base No influence based weighting—e.g. a given user has more influence than another.

No grammar modeling—some items can only be processed at the whole-item level and cannot be dealt with as pieces. This will be dealt with in the future. Example "The apple tasted great. It was awesome." The "it" talks about the apple previously mentioned.

Sarcasm—Sarcasm is tagged in the same way as literal speech for scoring purposes here; however, detection of sarcasm is handled differently by the automated scoring engine.

Piece Level Scoring

Scoring of social media posts (or "items") involves aggregating the piece scores. Different methodologies to combine a set of piece scores into a single item score are possible dependent on the chosen parameters. For human scoring, for example in one embodiment, a scale range between −2 . . . +2 of sentiment is chosen, where a score of −2 represents strong negative sentiment and a score of +2 represents strong positive sentiment, a score of −1 represents moderate to weak negative sentiment, and a score of +1 represents moderate to weak positive sentiment. A score of 0 represents no detectable sentiment, or neutral sentiment. Sometimes it may be difficult, or not possible, to assign a sentiment value.

Based on the criteria chosen in this embodiment, here are a few examples:

| Single Piece Examples | | |
|---|---|---|
| Statement | Piece Score | Sentiment |
| I love apples. | {+2} | Strong positive |
| I like apples. | {+1} | Moderate or weak positive |
| Apples are red. | {0} | No sentiment* |
| Apples are frabjous. | {U} | Unknown . . . How to score?** |
| Apples are yummy and awful. | {M} | Mixed |
| Apples are OK. | {0} or {+1} or {U} | people will score differently |
| Apples suck. | {−2} | Strong negative |
| Apples)((*32 ok owrs | {X} | Not scored*** |
| Apples are better than oranges. | {0} or {+1} or {U} . . . | Relative scoring is tricky |

*Note that red may convey sentiment if other context is present in the surrounding sentences or general context.
**Some users may not score this because they do not know what "frabjous" means whereas others may know the meaning and score it as highly positive.
***Something not right or just accidentally skipped over by the human scorer.

For the items above, the scoring methodology is relatively straightforward. A panel of humans can be given simple instructions on how to score the above sentences. The humans may not agree on each piece or item present (in fact, an individual may score the same item differently depending on mood, time and other factors). However, they have no trouble following the instructions. This is what makes for a repeatable scoring and quality auditing process. To account for variation in human interpretation, each item is presented to multiple human scorers. In this way, for each item, we acquire a set of the scores from the human testers for each item:

I love Apples→{+2, +2, +2, +2, +2, +1, +2}
I like Apples→{+1, +1, +1, +2, +2, +1, 0}
Apples are frabjous→{U, U, +2, U, +2, +2, U}

Accuracy vs. Precision

The different scores from the human scorers can now be used for probabilistic data processing. Generally, each item is assessed to determine the degree of reliability. In statistical terms, this relates to accuracy and precision (or confidence). Accuracy implies a measurement estimate of the variable is centered on its real world value, whereas precision implies a high degree of certainty in the measurement stated.

Figure 14:
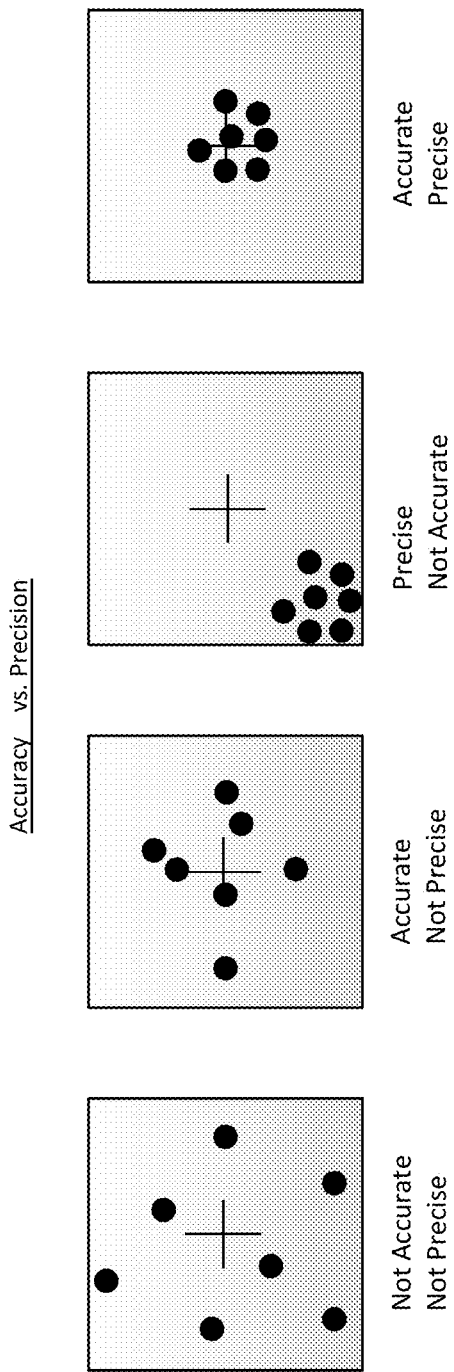
FIG. 14 is a pictorial diagram illustrating sampling of accuracy verses precision data in accordance with the present invention

FIG. 14 depicts scenarios showing the classical issues of accuracy versus precision in statistical terms where the "+" is the actual value and the dots are the measurements:

Scoring Aggregation

Estimates of overall score can be made by taking all the human tester's measurements of an item and aggregating the results to single value. One challenge for computing standard descriptive stats here is that while −2 . . . +2 is on a linear range, the other items {U, M, X} are not really part of that scale, so assigning a single dimension linear score may not be clear. One way to handle this difference is treating scored items (e.g. −2 . . . 0 . . . +2) and {U, M, X} separately.

Some common ways to combine the array of scores for a single piece are described below:

mean—take the average of all the human scores.
median—take the value for which half the scores are "above" and half are "below." (See note above relative to U, M, X). The median can be very "stable" in the sense that once many testers have labeled a single piece-score it is unlikely that a single tester's input will change the median when there are even a moderate number of samples in the pool. However, it quantizes the result harshly when the scale (in our case −2 . . . +2) has so few possible values.
mode—take the most commonly occurring score.
alpha trimmed mean—sort all the scores, drop x % of the highs and lows and take the mean of the remaining items. For example, we drop the high and low scores and take the average of the rest. This allows us to get rid of outliers while preserving the middle ranked scores. So if x=20% then the high 10% and low 10% of the scores are dropped before calculating the mean.

Generally, the best score estimate is computed from the entire array of scores { . . . }, rather than a single statistical output measurement. However, it may be unwieldy or cumbersome to deal with the entire array of scores, and thus, for illustration purpose, a single statistic is chosen to represent the entire array. Examples of these are shown here:

TABLE 1

Example: Methods of Aggregate Scoring

| | Human Scorer | | | | | | | | | | Aggregate Scoring Method | | |
|---|---|---|---|---|---|---|---|---|---|---|---|---|---|
| Piece | 1 | 2 | 3 | 4 | 5 | 6 | 7 | mean | median | mode | alpha trim (0.3) |
| I love Apples | 2 | 2 | 2 | 1 | 2 | 2 | 2 | 1.9 | 2 | 2 | 2.0 |
| I like Apples | 1 | 1 | 1 | 2 | 0 | 1 | 2 | 1.1 | 1 | 1 | 1.2 |
| Apples are frabjous | U | U | 2 | 2 | U | U | 2 | 2.0 | U | U | 2.0 |
| Apples are yummy and awful | M | M | −2 | 2 | M | U | −1 | −0.3 | ? | M | ? |
| Apples are OK | 1 | 2 | 1 | 2 | −2 | 2 | 1 | 1.0 | 1 | 1 | 1.4 |
| Apples are tart. | 1 | 2 | −2 | U | −1 | 0 | M | 0.0 | 0 | — | 0.0 |
| I HATE APPLES!! | −2 | −2 | −2 | −2 | −2 | −2 | −2 | −2.0 | −2 | −2 | −2.0 |
| Apples are really good | 2 | 1 | 2 | 2 | 2 | 1 | 2 | 1.7 | 2 | 2 | 1.8 |
| Apples are good | 2 | 1 | 2 | 2 | 0 | 2 | 2 | 1.6 | 2 | 2 | 1.8 |

Estimates of Scoring Stability

Estimates of score stability allow the ability to determine the level of confidence in a particular piece's score. Humans may or may not agree on how to audit a machine's output (e.g. a sentiment engine).

Standard Deviation—a measure of the total volatility of scores, requires ordinal values Standard Deviation of the alpha trimmed mean—same as standard deviation but using alpha trim of the samples.

Range—can be estimated as {high-low} or as total number of bins used out of 8 {−2, −1, 0, 1, 2, U, M, X}, so the range could vary from 1 to 8 bins used. Note that, as the number of times a particular item is scored increases, it is to be expected that most of the bins will be used.

Histogram Standard Deviation—take the histogram of the scores and divide each bin by the number of scores. Then sort the bins from high to low. Stable scores will have the most scores in a single bin. Semi-stable scores will have the scores lumped into a couple of bins. Unstable scores—low confidence scores will be spread evenly across many bins.

Total Bin Weighted Histogram Variance (TBWHV)—take the histogram of the scores and divide each bin by the number of scores resulting in each bin being normalized. Then, compute the variance of the normalized bins. A number near 1.0 indicates a single mode distribution around the highest scoring bin. If the number is less than about 0.7, then it becomes clear the scores significantly spread over more than one bin. This may not in itself represent a sign of instability, as if the item is ordinal but the true value is between 2 bins, there may be quantization error of scale resolution (e.g. if the "true" value is 1.5 and half the scores are 1 and half the scores are 2, then the TBWHV will show a spread between 2 bins while simple inspection of the ordinal standard deviation shows the score to be dithered and stable). Statistically this property is used in half toning in laser printers.

than these folks that tend to take a more extreme view on scoring, human scorers tends to be essentially random—not paying attention, occasionally mis-clicking on the intended result, etc.

This can also be accounted for by using descriptive statistics. If an item is scored multiple times, it would be possible to build a model of how the different human scorers perform relative to each other. This can allow us to slowly filter human scorers that are detected to be statistically unreliable. For example, if a prize is offered for testing 1000 samples and a person just randomly assigns scores so they can finish quickly, it may result in a standard deviation relative to their peers' scores that their scoring is off. Some individuals may be very good in certain categories and somewhat random in other categories. This is to be expected as different individuals have different expertise and experiences.

Category Membership Scoring

The sentiment analysis engine 24 also groups and scores categories in addition to sentiment. Categories are grouped both by brands plus models and by subject area (e.g., Fruits could have brands of Apples, Oranges, Bananas, and subjects of Taste, Nutrition, Cost). Category scoring does not have an ordinal scale (e.g., there is no −2 . . . +2 scale) for membership of a particular passage of text to a category relative to another category although humans or machines may attribute a particular passage as belonging to one or more categories. In an alternative embodiment, an aggregate scoring metric may be provided as to whether a passage of text belongs to a category, brand, or subject area. Estimates of stability scoring for set membership assignment is provided. In this case, the modality of the category membership is estimated by Total Bin Weighted Histogram Variance.

Item Level Scoring

In order to create a review or item level score, the stream level scores are aggregated. However, some items may contain a single piece, while other items could contain many pieces. Methods may combine the piece score into an item score, which may includes weighting each of the individual

TABLE 2

A Few Methods of Estimating Score Stability

| Piece | Human Scorer | | | | | | | StDev of Hist | Score Stability Assesments | | |
|---|---|---|---|---|---|---|---|---|---|---|---|
| | 1 | 2 | 3 | 4 | 5 | 6 | 7 | | StDev Hist *Nbins | Hist Var | TBWHV |
| I love Apples | 2 | 2 | 2 | 1 | 2 | 2 | 2 | 0.32 | 2.24 | 0.10 | 0.71 |
| I like Apples | 1 | 1 | 1 | 2 | 0 | 1 | 2 | 0.22 | 1.53 | 0.05 | 0.33 |
| Apples are frabjous | U | U | 2 | 2 | U | U | 2 | 0.25 | 1.73 | 0.06 | 0.43 |
| Apples are yummy and awful | M | M | −2 | 2 | M | U | −1 | 0.14 | 1.00 | 0.02 | 0.14 |
| Apples are OK | 1 | 2 | 1 | 2 | −2 | 2 | 1 | 0.20 | 1.41 | 0.04 | 0.29 |
| Apples are tart. | 1 | 2 | −2 | U | −1 | 0 | M | 0.00 | 0.00 | 0.00 | 0.00 |
| I HATE APPLES!! | −2 | −2 | −2 | −2 | −2 | −2 | −2 | 0.38 | 2.65 | 0.14 | 1.00 |
| Apples are really good | 2 | 1 | 2 | 2 | 2 | 1 | 2 | 0.27 | 1.91 | 0.07 | 0.52 |
| Apples are good | 2 | 1 | 2 | 2 | 0 | 2 | 2 | 0.26 | 1.83 | 0.07 | 0.48 |

Statistical Experiment Design. While the above methods show simple methods of combining scores, more formalized approaches combine both aspects of accuracy and precision estimation for each item. This branch of statistics is called Block Testing.

Estimates of Human Scorer Stability. One factor is whether the humans' scoring aligns with others. Perhaps some are just "hard graders"—this group almost never issues +2, whereas another person may be an extreme grader nearly always using +2, −2 and very rarely +1 or −1. Other piece scores. If a person writes several pieces in a given item and another writes just one piece, how to relate the first person's more verbose comments to the second one's terse comments? Weighting of a given individual vs. another. Generally people do not write in a vacuum but in context—they write several things, often related but separated by time or venue (e.g. they tweet and post on Yelp).

In Sentiment Magnitude Scoring, an assumption is made that piece level sentiment is separable and can be aggregated. Such assumption is not made in Mapped Sentiment scoring, which takes grammar components from all of the pieces and uses grammar properties to create a single item level scored.

Stream Level Scoring

In order to provide useful measurements of aggregated sentiment across thousands or millions of items several factors must be taken into account.

Relative Scoring—scoring and weighting of one product brand relative to another (e.g. United is better than Delta).

Weighting—which items (if any) should receive more strength.

Tweet vs. Review—for example should a single tweet receive less weight than a fully written review?

Influence—should a given user have more weight (a measure of their influence)?

Retweets—if an item is repeated thousands of times should the aggregate number of identical items get treated with a different weight? What if the items are mostly the same?

Confidence Measurements—providing margins of error for our system is important both for knowing how the engine is performing and also for determining whether our sample can be extrapolated to the larger population.

Data Sufficiency—how many items are enough to prove statistical significance to infer a hypothesis (score) at the stream level.

Distribution Effects—a "large" number of items are often expected to show central tendency—which means they exhibit a somewhat normal distribution with a stable mean and standard deviation. However, this is often not true—some topics/streams will be highly modal (like who should be elected president). To accommodate for this we can test for central tendency and always publish confidence intervals and Chebychev distribution confidence intervals. Chebychev confidence is more relaxed but applies to any distribution shape.

Windowing Functions—just as in classical signal processing windowing effects can distort or show different properties of data given how long a window length is, the volume of data, and also the shape of the window function (e.g., Rectangular, Hamming, Hanning, etc.).

Sentiment Magnitude Engine Scoring

The sentiment scoring engine takes each Item, and parses the text into pieces. Generally there are three types of scoring exercises:

Human Audit—a single person will score some items in a stream for spot checking.

Human Tagged—multiple persons will score each item to build a model both for QA and for engine development.

Engine Output—the Sentiment engine examines text and outputs scores at both the category and aggregated levels.

In one embodiment, human scoring in the present invention is being transitioned a crowd-sourcing tool. This section introduces the Sentiment Magnitude score: in 3 phases:

Sentiment Piece Score 1.0→metric for scoring small fragments of text-based pieces Sentiment Item Score 1.0→metric for scoring items based on their piece scores Sentiment Stream Score 1.0→provide metric at the volume/stream level for a given epoch Sentiment Piece Score Version 1.0 (MSPS-1.0) for QA auditing Given the above criteria, the following steps provide a statistically justifiable method for creating a single piece score:

Human Audited:

A human scorer scores each piece once on the scale of $\{-2 \ldots +2, U, X, M\}$ Human Tagged:

Sample each piece at least 7 times each piece (n=7). Remove all the items scored "X".
1. At least 67% (k=0.67) pieces must be numerically scored {e.g. not U, X, M}
2. If less than k % are numerically scored:
3. If more than half of the bins are "M" the score is set to "M"
4. Else the score is set to "U"
5. Take the alpha trimmed mean of the numerically scored items with the trim set at 30% ($\alpha$=0.30). This is the final score.
6. $\mu_{\alpha=0.3}$ Parameters (formalized)

n=Number of items
k=Keep threshold
$\sigma$=Sample Standard Deviation
$\alpha$=trim percentage factor
$\mu_\alpha$=final trimmed mean In this case our statistic as proposed is:
$\{n=7, k=0.67, \mu_{\alpha=0.3}\}$

EXAMPLE $\{2, 2, 1, 0, 2, 2, 2\}$

We don't have any $\{U, X, M\}$ so all the scores are kept

We throw away 0, 2 (they are the high and low, representing the top 15% and bottom 15% of the trim)

now we have $\{2,1,2,2,2\}$, so the mean of these remaining items=

$\mu_\alpha$=1.8←This is the final score.

The final score for each piece consists of the following:

The trimmed mean as described above.

The standard deviation of the scores.

Note that the Sentiment Engine issues a single score for each piece, which is also assigned to a category.

Sentiment Item Score

Items comprise one or more pieces. The piece scores are accumulated to form a final item score.

Multi-piece (item level) examples

Apples taste great, but they are too pricey.

$\{+2, -2\}$←contains both positive and negative sentiment.

I love Apples. They are cheap too.

$\{+2,+1\}$←two measures of positive sentiment.

Item level scoring is done as follows:
1. All piece scores marked as "M" or "U" or "X" are set to 0.
2. Sum up the piece scores.
3. Divide by square root of the number of piece scores.
4. Only 1 significant digit is retained to right of the decimal place.

EXAMPLES

Piece scores=$\{2, 2, -1\}$
  Item score is: (2+2+-1)/sqrt(3)=3/1.73=1.7
Piece scores=$\{2, 2, 1, 0\}$
  Item score is: (2+2+1+0)/sqrt(4)=5/2=2.5
Piece scores=$\{-2\}$
Item score is: (-2)/sqrt(1)=-2/1=-2.0
Piece scores=$\{-2, -2, -1\}$
  Item score is: (-5)/sqrt(3)=-5/1.73=-2.9

Piece scores={M, −2, U}
  Item score is: (0+−2+0)/sqrt(3)=−2/1.73=−1.2
The Item score preserves polarity and maintains a logarithmic magnitude (those who write more sentiment bearing phrases get weighted more).

The Item score applies to both engine scoring and human scoring.

Weight of sources (e.g. is a Yelp review worth more than a Twitter tweet), is done at the stream scoring level. Often the meaning of a set of sentences (e.g. a whole review) cannot be broken up at the sentence-by-sentence level. This is beyond the scope of magnitude sentiment scoring and is handled as a mapped sentiment scoring issue.

Sentiment Stream Scores

To calculate a value for a stream over a period of time (epoch) we combine the item level scores from several sources into a single statistic.

For each source: Aggregate Source Score=$A_{ss}$=average (all the item scores for that source) where U, X, M are all scored as 0.

Combine all the Aggregate Source Scores as follows:

$$\text{Final Score(MSSS)} = (A_1 * W_1 + A_2 * W_2 + \ldots A_n * W_n)/n$$

Where $W_1 \ldots W_n$ are weights that are settable by end user. One embodiment of the default weight sets provided below:
- Even Weight (Wew)→all weights are set to 1.0→means all sources treated equally
- Volume Adjusted Item Weight (Wvaiw)→Each weight is set according the amount of items in its corresponding source and divided total number of items process across all sources. (e.g. if there are 100,000 twitter items and 9382 Yelp reviews in a set then the Twitter weight would be 100,000/(100000+9832) and the Yelp weight would be 9832/(100000+9832).
- Volume Adjust Piece Weight (Wvapw)→Each weight is set according the number of Pieces in its corresponding source and divided total number of items process across all sources. Same as VAIW but since reviews typically have more pieces they will be weighted more.
- Log Volume Adjusted Item Weight (Wlvaiw)→Each weight is set according to the Logarithm (base10) of the volume of items (e.g. 100,000 Twitter items and 9832 Yelp reviews, the Twitter weight would be Log 10(100,000)/(Log 10(100,000)+Log 10(9832)).
- Log Volume Adjust Piece Weight (Wlvapw)→Each weight is set according to the Logarithm (base10) of the amount of pieces in its corresponding source and divided total number of items process across all sources. Same as VAIW but since reviews typically have more pieces they will be weighted more.
- User set weight→The user loads their set of weights into the system.
- Default Weight Set is the Even Weight Set.

Figure 3:
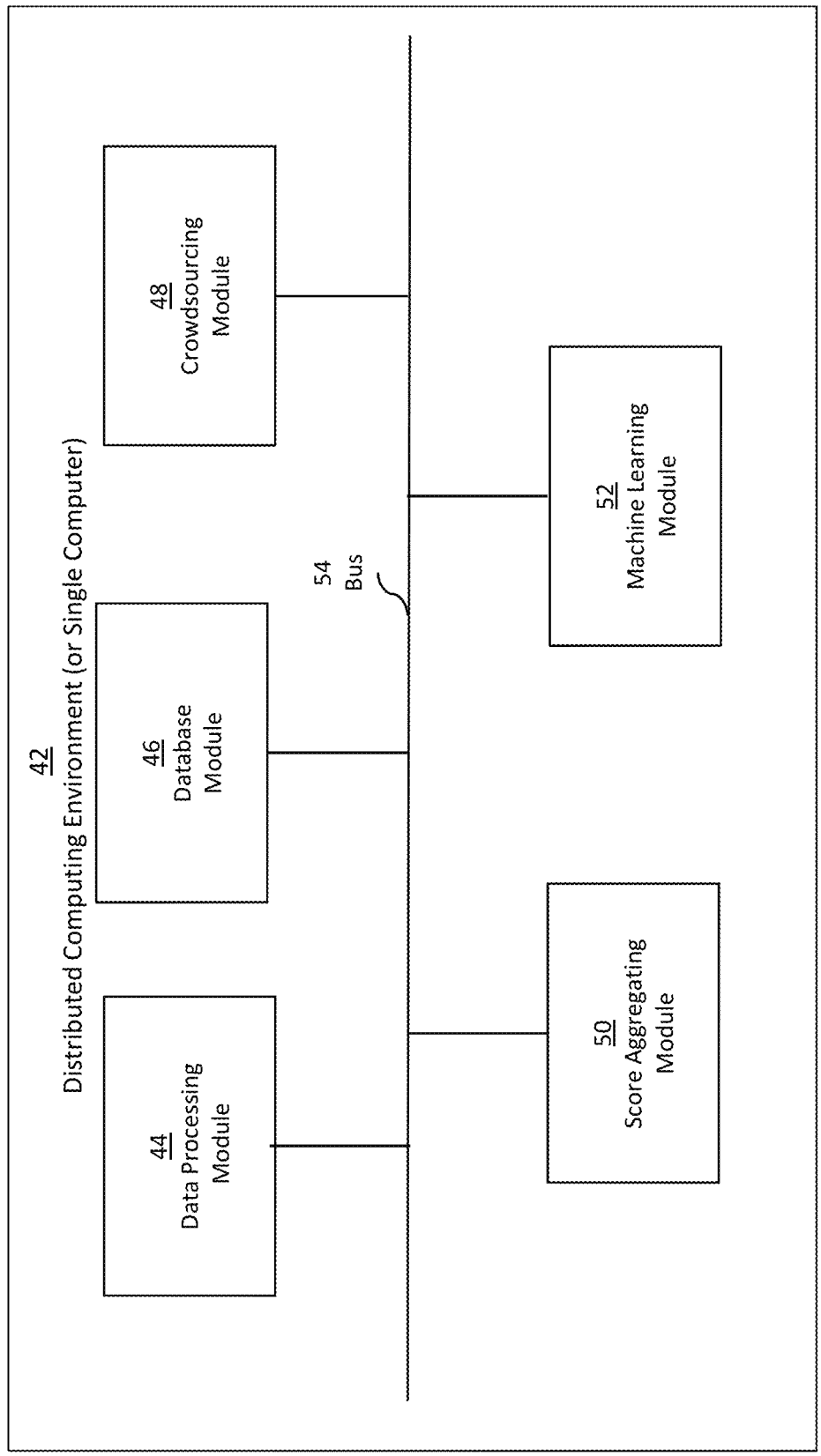
FIG. 3 is a software system diagram illustrating a distributed computing environment (or a single computing environment) with a data processing module, a database module, a crowdsourcing module, a score aggregating module, and a machine learning module in accordance with the present invention.

FIG. 3 is a software system diagram illustrating a distributed computing environment (or a single computing environment) 42 with a data processing module 44, a database module 46, a crowdsourcing module 48, a score aggregating module 50, and a machine learning module 52, where the modules 44, 46, 48, 50, and 52 are communicatively coupled to a bus. The data processing module 44 is configured to get streaming data and then tag the streaming data automatically using the machine learning output. The tagging of a streaming data message may be spam type, duplicate or not, industry type, category type, a topic or category of sentiment. For example, a customer may have stayed at a hotel, which afterward the customer posts on a social media site about the ambience of the hotel room or about the attentiveness of customer service at the hotel. After tagging the streaming data, the data processing module 44 is configured to send the tagged streaming data to the database module 46. The database module 46 is configured to save the tagged streaming data in the database. The crowdsourcing module 48 is configured to select a subset of social media posts that have been previously stored in the database 12, and present the social media posts on the Web, which then tags each social media post with different attributes. The crowdsourcing module 48 is configured to provide a sentiment score to a social media post, such as giving it a +2, +1, −1, −2, unknown, mixed, or neutral score. All of these outputs are then saved in the database 12 and the score aggregator 50 is configured to get the user scores and aggregate them to produce some statistically meaningful scores, which can be, for example, an average score. The score aggregator module 50 is configured to provide a score based on a user's feedback for each social media post. The machine learning module 52 is configured to use the output from the score aggregator module 48, and learns (or develops) a model from the given data. The output from the machine learning 52 is used by the data processing module 44 for sentiment tagging.

Figure 4:
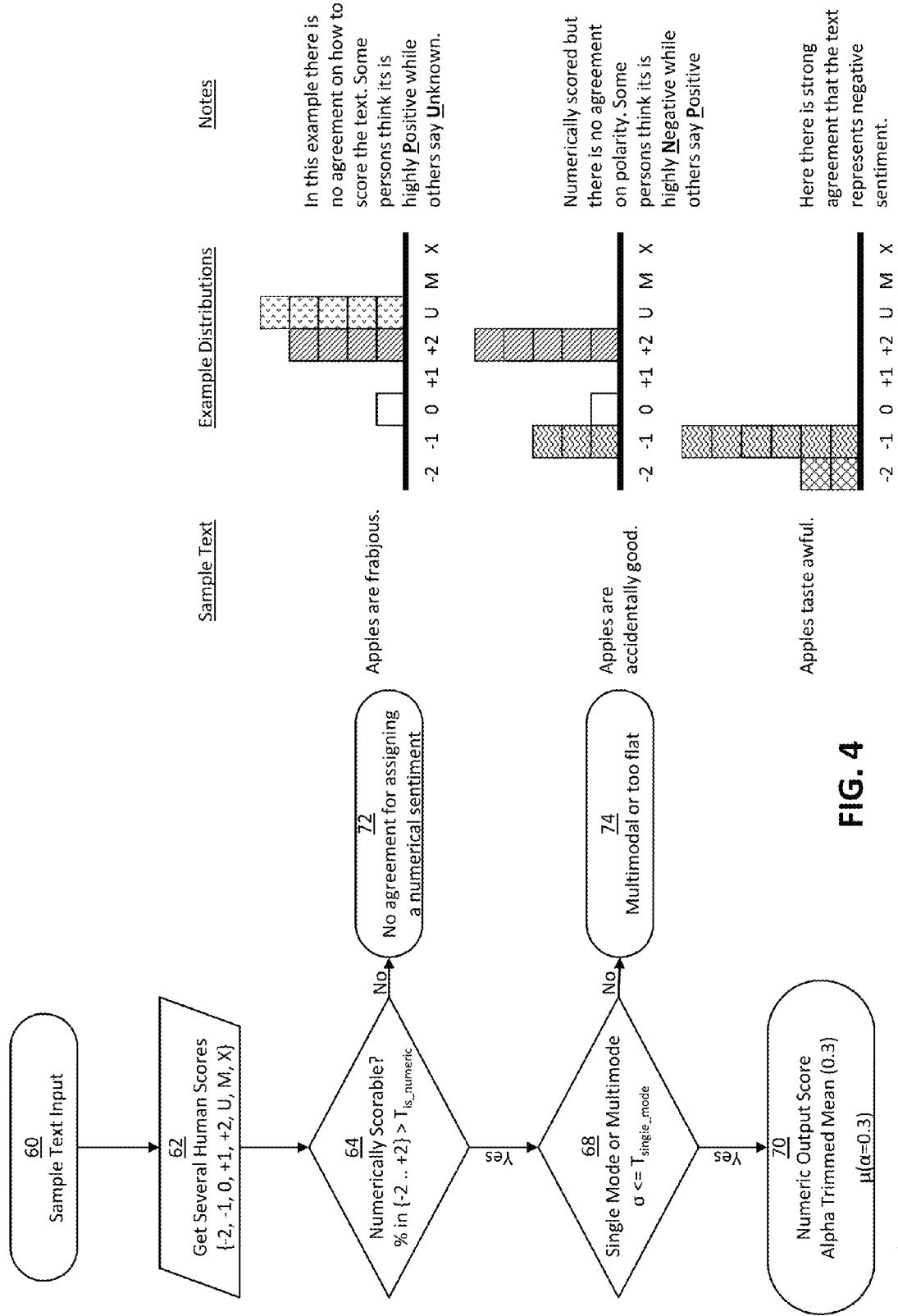
FIG. 4 is a flow diagram illustrating the process of gathering human scoring in accordance with the present invention.

FIG. 4 is a flow diagram 58 illustrating the process of scoring in accordance with the present invention. At step 60, the database cluster 12 is configured to store social media posts and provide sample text input. At step 62, the crowdsourcing server 32 is configured to collect numerous human scores for each attribute associated with the text document. At step 64, the score aggregating module 50 is configured to determine whether each piece in a text document is numerically scorable by the presence of a human agreement. If there is no human agreement at step 72, no numerical sentiment is assigned to the text document. At step 68, if there is a human agreement to one or more pieces in the text document, there could potentially be two outcomes, single mode or multimode. A multimode output is generated at step 74 if the determination at step 68 results in a multimode outcome. The score aggregating module 50 is configured to generate a numeric output score at step 70 if the outcome at step 68 is single mode.

Figure 5:
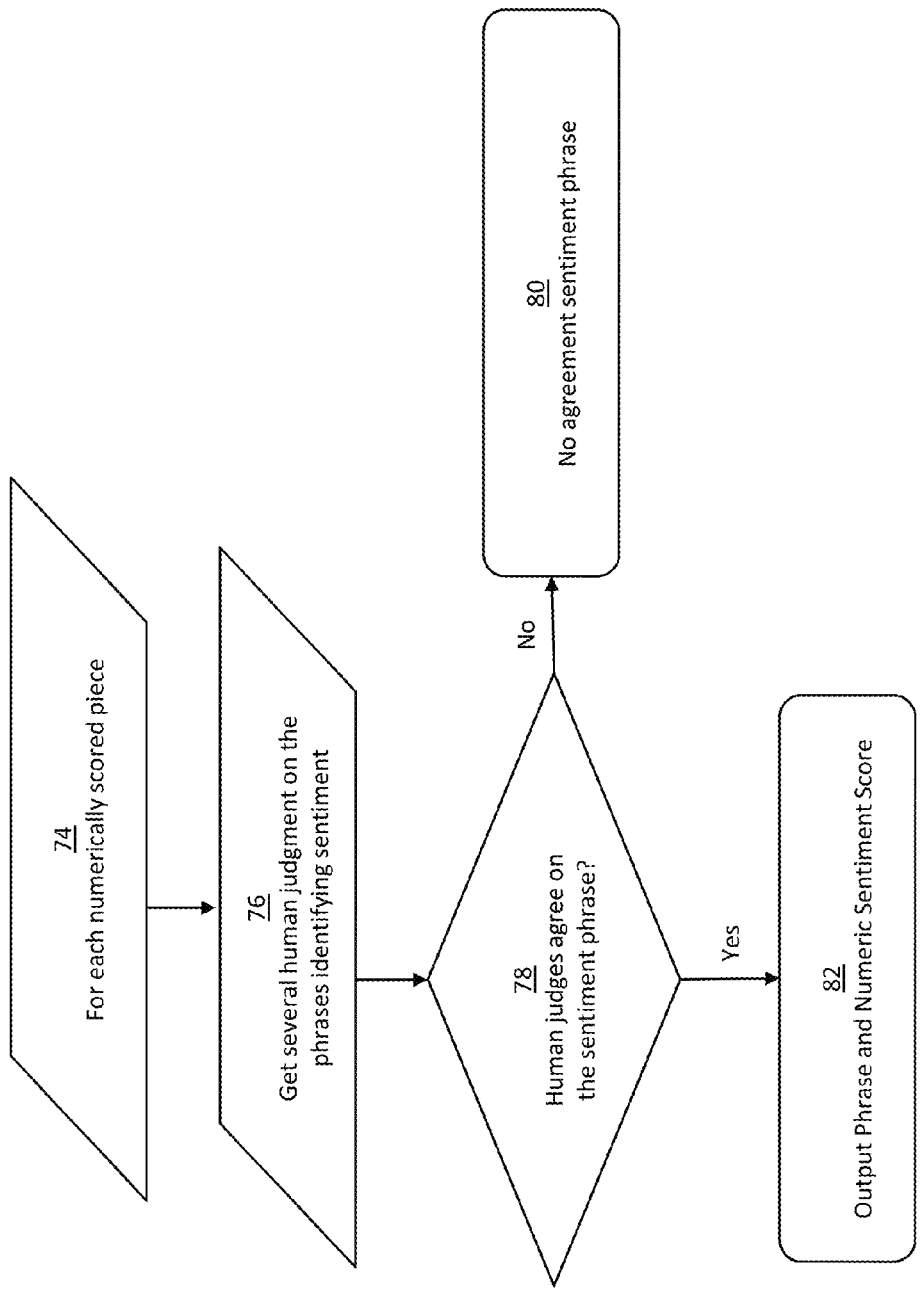
FIG. 5 is a flow diagram illustrating the process of determining a numeric sentiment score and the associated sentiment phrase based on data of multiple human judgments in accordance with the present invention.

FIG. 5 is a flow diagram 72 illustrating the process of determining a numeric sentiment score based on data of multiple human judgments in accordance with the present invention. At step 74, the score aggregating module 50 is configured to receive one or more pieces of the text document, which have been numerically scored. At step 76, the score aggregating module 50 is configured to collect numerous human judgments on phrases within a piece that identify sentiments. At step 78, the score aggregating module 50 is configured to determine whether there is an agreement between humans on the identified sentiment phrase. At step 82, the score aggregating module 50 is configured to generate an output containing the sentiment phrase and the associated numeric sentiment score. If there is no human agreement on a sentiment phrase, the process is directed to step 80.

Figure 6:
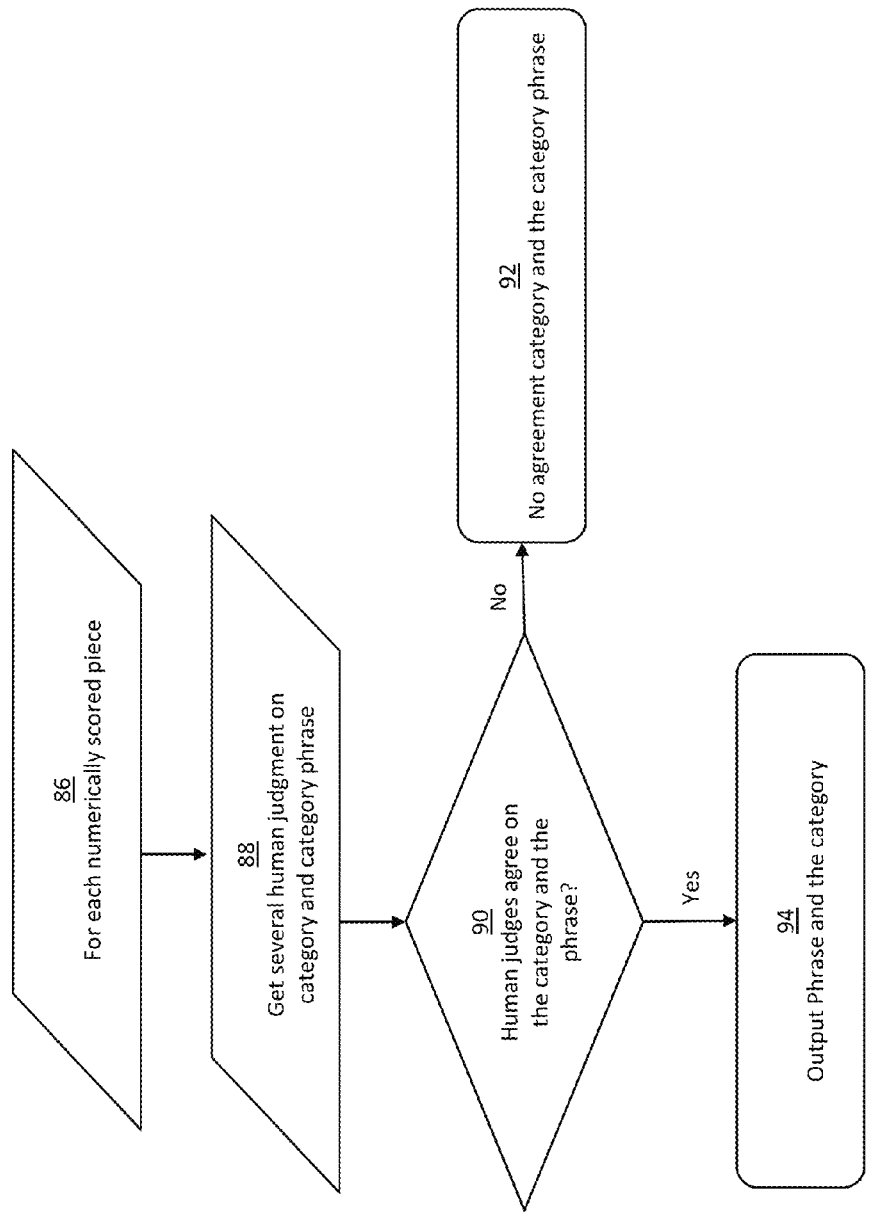
FIG. 6 is a flow diagram illustrating the process of determining if the data of multiple human judgments converges on a category and the identifying category phrase in accordance with the present invention.

FIG. 6 is a flow diagram 84 illustrating the process of determining whether the data of multiple human judgments converges on a category in accordance with the present invention. At step 86, the score aggregating module 50 is configured to receive one or more pieces of the text document which have been numerically scored. At step 88, the score aggregating module 50 is configured to collect numerous human judgments on a category and a category phrase within a piece that identify sentiments. At step 90, the score aggregating module 50 is configured to determine whether there is an agreement between humans on the identified category and category phrase. At step 94, the score aggregating module 50 is configured to generate an output containing the category and category phrase. If there is no human agreement on a category and category phrase, the process is directed to step 92.

Figure 7:
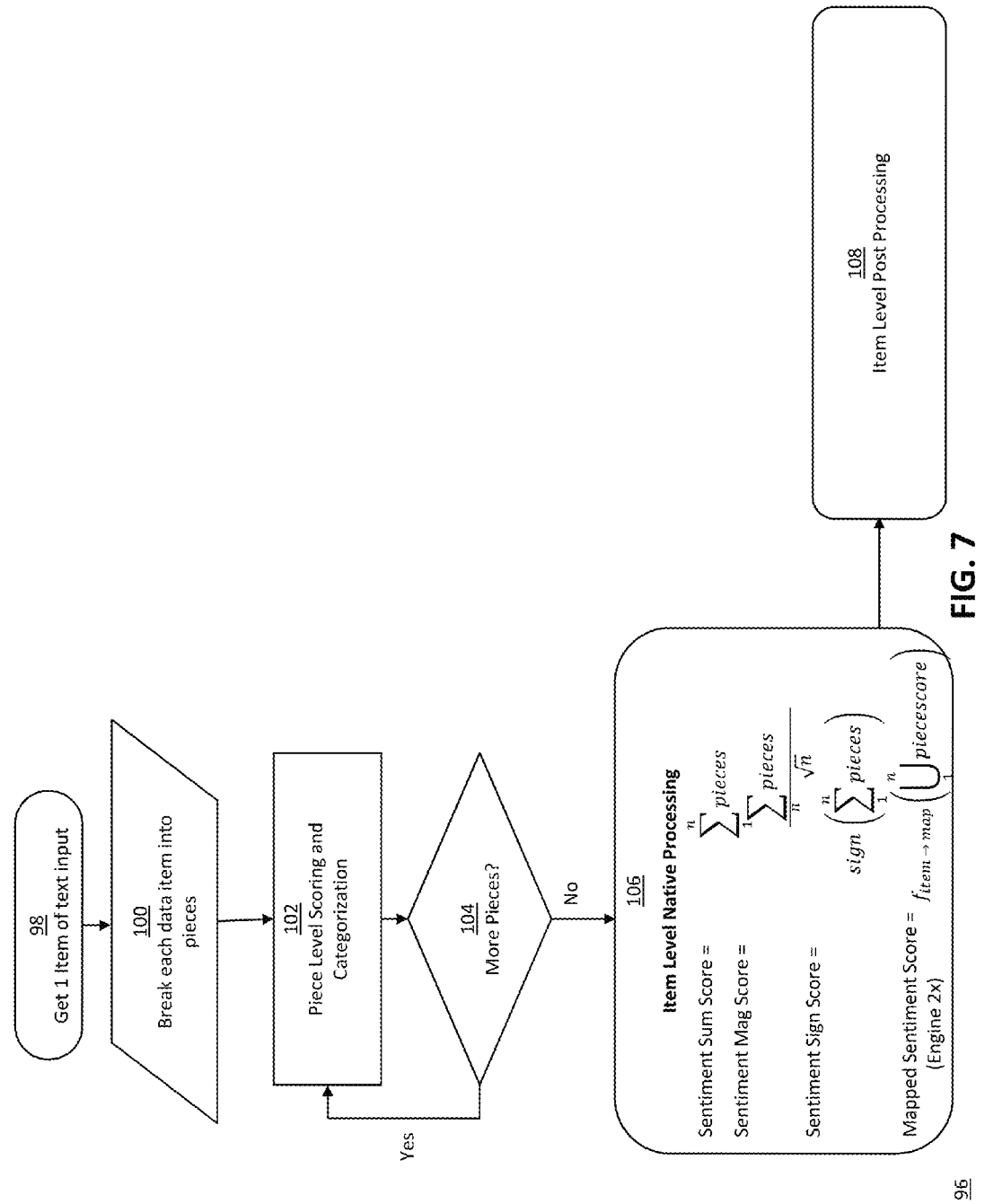
FIG. 7 is a flow diagram illustrating the process of piece level scoring and item level native processing in accordance with the present invention.

FIG. 7 is a flow diagram 96 illustrating the process of piece level scoring and item level native processing in accordance with the present invention. At step 98, the data processing server 20 is configured to retrieve an item of text document. At step 100, the sentiment analysis engine 24 is configured to divide the text document into one or more pieces. The sentiment analysis engine 24 is configured to generate a piece level scoring and categorization for a piece in the text document at step 102. The sentiment analysis engine 24 is configured to determine any remaining pieces in the text document that have yet to be scored and categorized at step 104. If the response is affirmative, the process returns to step 102 for the sentiment analysis engine 24 to further process additional pieces of the text document with piece level scoring and categorization. This iterative loop between steps 102 and 104 will continue until all pieces of the text document have been scored and categorized. At step 106, the sentiment analysis engine 24 is configured to compute item level native processing of one or more pieces of the text document, thereby generating sentiment sum score, sentiment magnitude score, sentiment sign score, and mapped sentiment score. The sentiment analysis engine 24 is configured to conduct item level post processing, e.g. sparkscore, at step 108.

Figure 8:
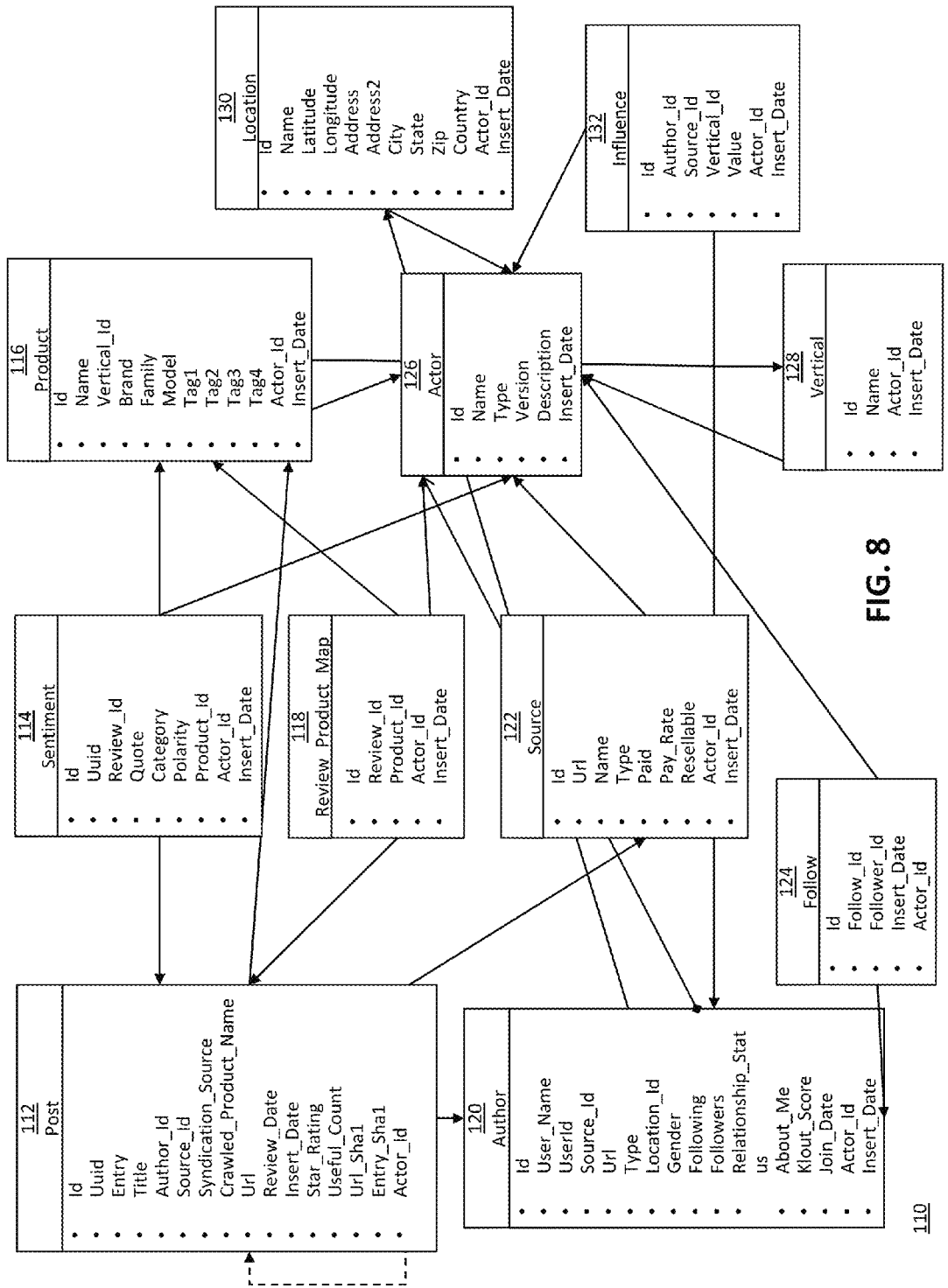
FIG. 8 is a block diagram illustrating an example of data model snapshot in accordance with the present invention.

FIG. 8 is a block diagram illustrating an example of a data model snapshot in accordance with the present invention. In this embodiment, an illustrated data model 110 includes a variety of data types, such as post data 112, sentiment data 114, product data 116, review product map data 118, author data 120, source data 122, follow data 124, actor data 126, vertical data 128, location data 130, and influence data 132.

Figure 9:
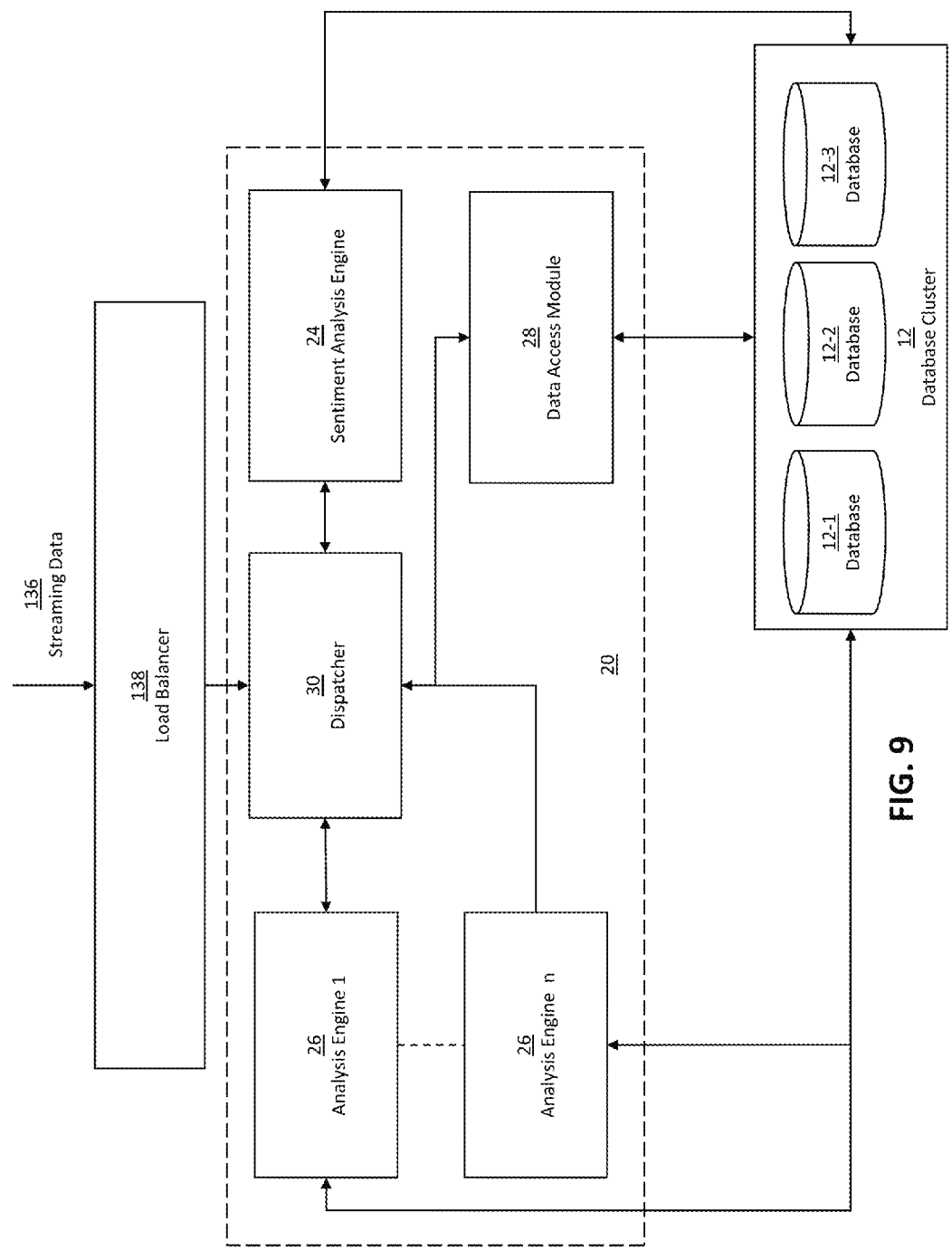
FIG. 9 is a block diagram illustrating the data processing server coupled to a load balancer in accordance with the present invention.

FIG. 9 is a block diagram illustrating one or more data processing servers coupled to a load balancer 138 in accordance with the present invention. The load balancer 138 receives a massive amount of incoming data 136, in which the load balancer 138 distributes the incoming data to one or more data processing servers 20 for efficient processing of social media posts (also referred to as "text documents").

Figure 10:
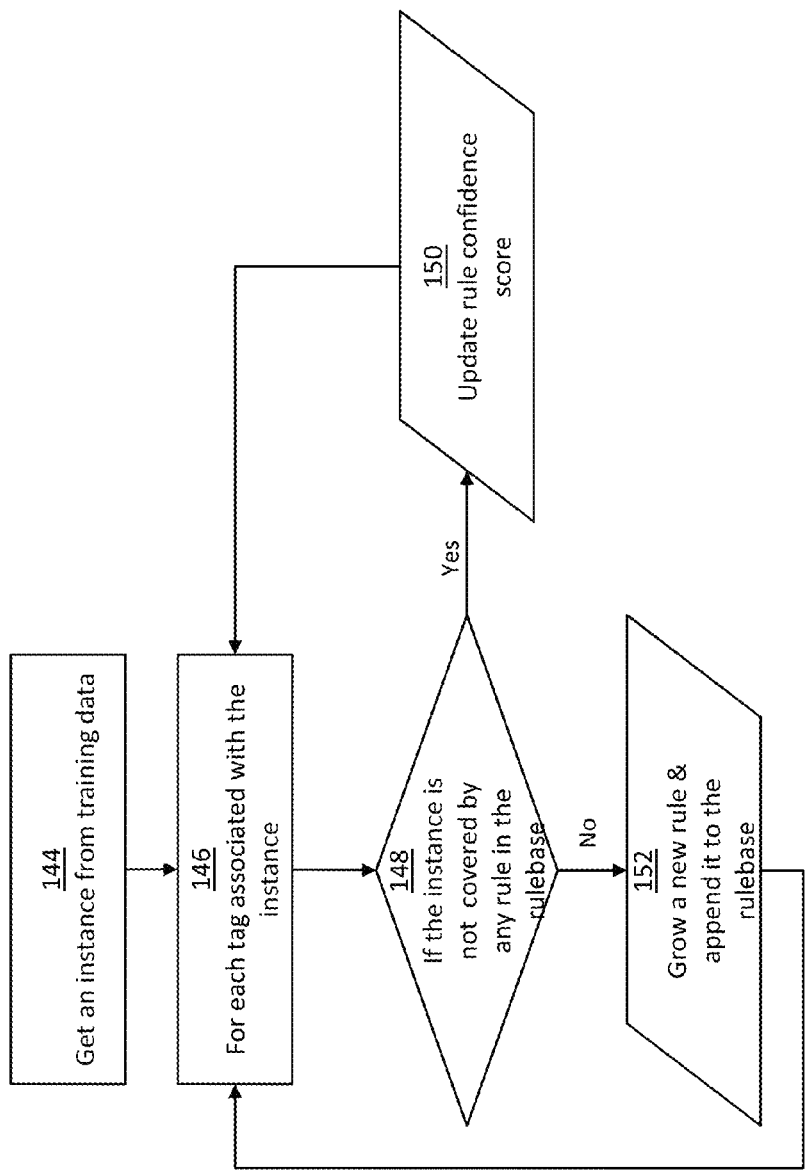
FIG. 10 is a flow diagram illustrating the process of tagging training data by the rules in the rulebase in accordance with the present invention.

FIG. 10 is a flow diagram 140 illustrating the process of tagging training data by the rules in the rulebase in accordance with the present invention. The machine learning module 52 is configured to receive an instance of training data at step 144. The instance of training data refers to a piece in the text document associated with sentiment and category. At step 146, the machine learning module 52 is configured to retrieve each tag (i.e. sentiment tag, category, sentiment phrase tag, etc.) associated with the instance of training data. At step 148, the machine learning module 52 is configured to determine whether the retrieved tag associated with the instance is covered by an existing rule in the rulebase 12-1. If an existing rule in the rulebase 12-1 is applicable to the retrieved tag associated with the instance, at step 150 the machine learning module 52 is configured to update a rule confidence score. However, if none of the existing rules in the rulebase 12-1 is applicable to the retrieved tag associated with the instance, the machine learning module 52 is configured to generate a new rule to be appended to the rulebase 12-1.

Figure 11:
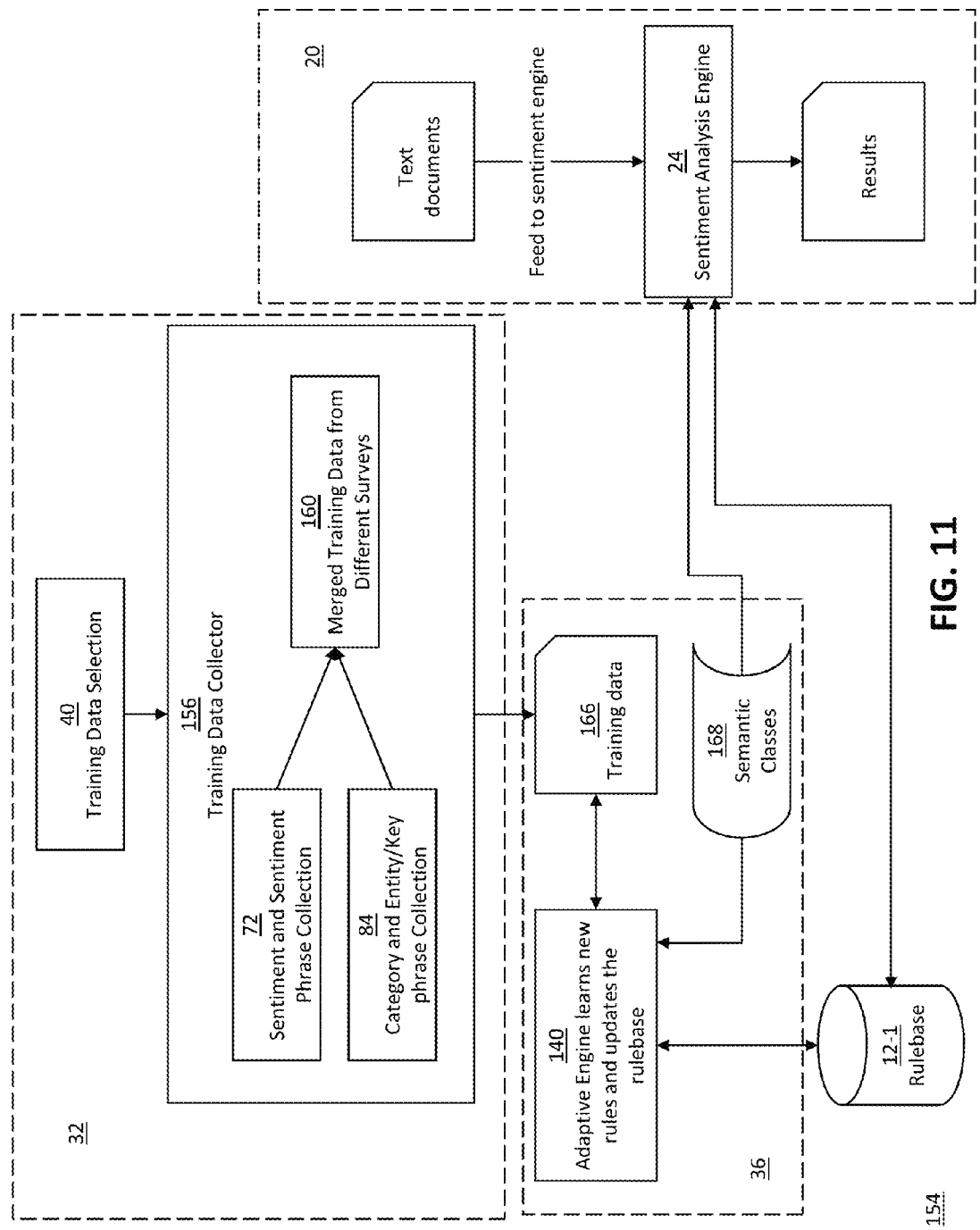
FIG. 11 is a block diagram illustrating an alternative embodiment of the hybrid human machine learning system in accordance with the present invention.

FIG. 11 is a block diagram 154 illustrating the interactions between different components in FIGS. 5, 6, and 10. The crowdsourcing server 32 includes a training data collector 156 for receiving selected training data 40 and for merging collected training data 160 from a combination of sentiments and sentiment phrase collection 72 and category and entity/key phrase collection 84. The crowdsourcing server 32 generates merged training data 160 to the machine learning server 36. The machine learning server 36 includes an adaptive engine 140 for receiving, processing, and learning a first input containing the merged training data 166, a second input containing existing rules from the rulebase 12-1, and a third input containing semantic classes 168. The combinational inputs into the adaptive engine 140 provide the basis for the machine learning server 36 to learn new rules and update the rulebase 12-1.

Figure 12:
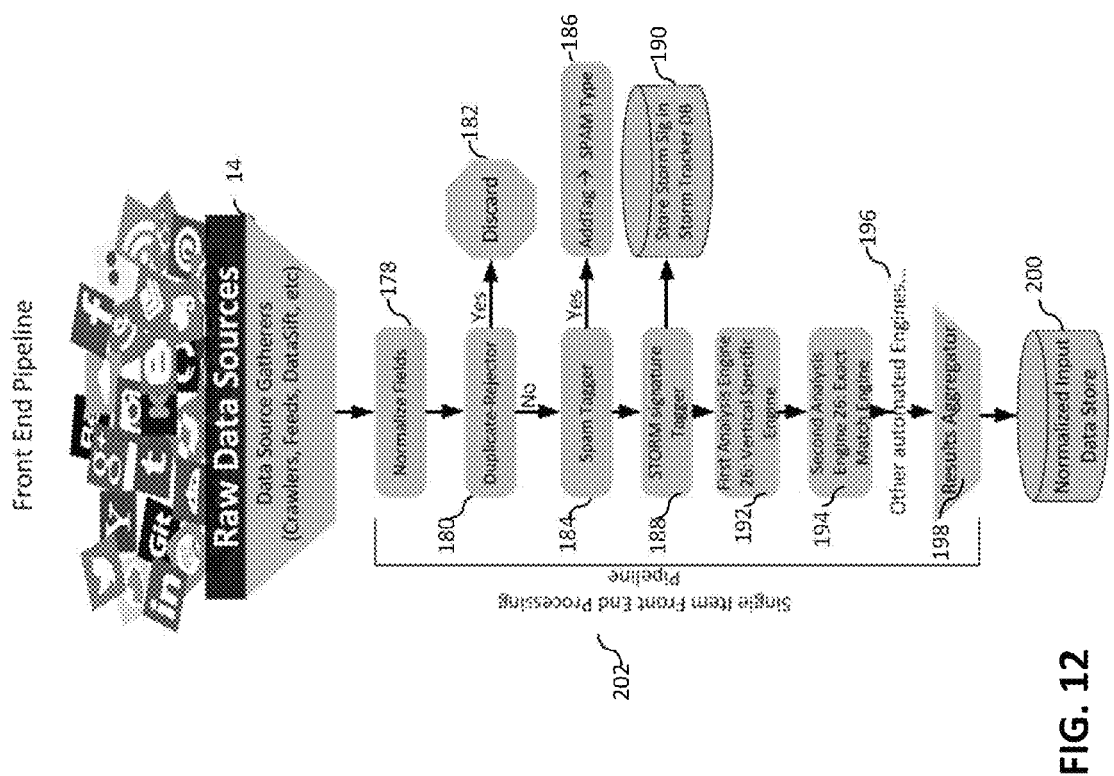
FIG. 12 is a flow diagram illustrating the hybrid human machine learning system in accordance with the present invention.

FIG. 12 is a flow diagram 174 that illustrates the hybrid human machine learning system. At step 178, the data processing server 20 normalizes a massive amount of incoming text documents from social media sites or other sources. The data processing server 20 comprises a plurality of analysis engines 26, in which each analysis engine can be assigned to execute a set of tasks. An analysis engine 26 determines at step 180 whether there are duplicates of the incoming social media posts in which any detected duplications are rejected. Any rejected social posts are discarded at step 182. At step 184, an analysis engine 26 determines whether any of the incoming social media posts are spam. Any incoming social media post that has been identified as spam is tagged as spam and the type of spam at step 186. At step 188, an analysis engine 26 processes the incoming social media posts to generate a storm signature and tag the storm signature. At step 190, the storm signature is saved in the database cluster 12. Representative steps 192, 194, and 196 show multiple analysis engines performing separate functions in the data processing pipeline. At step 198, an analysis engine 26 aggregates all the results from the different analysis engines 26 in steps 192, 194, and 196. At step 200, the normalized input data is stored in the database cluster 12. For additional information on the storm signature and concepts, please see U.S. Nonprovisional application Ser. No. 14/062,746, entitled "Method and System for Social Media Burst Classifications," filed on Oct. 24, 2013, and the corresponding Provisional Application, entitled "Social Media Burst Statistical Classification System," filed on Oct. 24, 2012, both of which are hereby incorporated by reference in their entireties.

Processing Text Data Objects

The item object presented below, is the logical (not necessarily physical) implementation of a piece of textual data coming from a source, and its associated normalized form, and subsequent attached analysis (zero or more scores[ ]). Scores are attached to this textual item object that has been processing sentiment or entity extraction. For some analysis, such as "storm" membership, only signature appears here because the knowledge of whether a textual item is a member of a storm or not is only available in a broader multi-item context (e.g. DB of matching signatures).

```
item_object
{ input as captured input_raw : {
    #raw fields from source (may be empty if norm-ing process is
    "perfect")
}
``` engines only operate on normalized data here:

```
input_normed: {
    input_id: <ID> #assigned ID from moodwire database
    input_title: string,
    input_body: string, #raw review text, tweet, crawled article, supplied
        data etc
    source_url : string,
    source_id : <ID>, #mw assigned source ID
    date_source : date_code_int #seconds since 1970, date as spec'd by
        source
    date_received : date_code_int, #seconds since 1970?, date
        processed by dB
    author_source_id: string or <ID> # source's ID (eg twitter handle)
    author_mw_id : string or <ID> #moodwire assigned ID if available
    storm_prefix_sig: <string>
    storm_prefix_sig_crc64: <64bit_int> #crc64 of storm_prefix_sig
    location_txt: string (profile city, etc) #if available
    location_lat_long: (GPS coords) #if available
}#end of input_normed
``` scores[ ] list

```
scores : {
    eng: <ID:Eng_Object>, #if"NP" this score is 'untrusted' for aggregation purposes
    model: <ID:Model_object> or versionString, #
    entity: <ID:Entity_Object>, #can be "NP" (e.g. spam, storm)
    feature: <ID:Feature_Object>, #will be "NP" for entity only detectors
                                  #SPAM is a feature
    mood: <score_value> #{numeric_score or 'x'or 'u' or 'm'}, default : 'x'
    sparkscore: {<score_value> or "NP", promotor/detractor/neutral} #can be NP
        conf:<score_value> #must be in integer range 0.. 1000 (saves space)
        #optional stuff below
        rule_hits: {"American Airlines"} #for exact engine, slot engine, debugging
        fields_used:[
            {
                field: <input_normed_field_used>, #eg: input_title, or input_body, etc
                field_range_start: int_index,
                field_range_end: int_index
            }, ...
        ]#end of fields_used
    }#end of scores
}
#"NP" = "Not Present" if object is not present (string)
```

Notes:
  model: field for humans can be reference to the instructions given (so we can see why people scored the way the did) or "NP"
methods on/for item objects
item.store( )→store in the DB, rejects duplicates based on input_normed criteria
item.addScore(score_obj_from_engine)→appends a score to list of scores, rejects dupe scores
item.getScore(index)→returns list of scores in item object, (if index==−1 returns all scores)
item.delScore(index)→removes the score object at specified index from the list of scores
Types of Scores:
  SPAM→feature:"SPAM", conf:1.3 # example SPAM score
  Storm→is only a sig is here. To determine storm or not, need to look up sig in storm DB Score are tuples of {ent,feature,mood} not showing the {engineID,model, conf,fields_used{ }}
  {ID of(United Airlines), "Airlines:service", 2.3}, #entity, type, and mood
  {ID of(United Airlines),"NP","x"} #entity, no mood
  {ID of(iPhone),"screen size","x"}, #entity, and feature detected, no mood
  {ID of(Delta),"general",}

Item_Object Processing Pipeline
1. normalize input
2. reject duplicates (e.g. if we have seen this normed input before we stop processing and don't send it down the line).
3. assign_id to item
4. convert_to_json_fields & store
5. add storm signatures→remember whether an item is a storm is held by storm engine DB
6. item.appendScore(SPAM_engine_result)
7. item.appendScore(ExactMatchEngine_result)
8. item.appendScore(NaiveBayesEngine_results)
9. item.appendScore(TagvanaHuman "Engine" results) #if we do have Tagvana results
10. item.appendScore(SparkScoreEngine_result) #SparkScore engine
11. item.appendScore(CorrectionEngine results) #if we have customer 'overide'
12. item.aggregateResults(scores[ ]) #count-up scores for indexing etc All fields can then be indexed by our indexer (e.g. results cache, elastic search etc) so we can perform free-form queries. etc
Information Extraction API
Stats on occurrence of fields by,
  vs time range (e.g. by hour, by month, but year)
  by entity (e.g. by product, person, organization, other)
  by mood
  by feature/category/vertical
Searching
  search capability: index by token (present|not_present)
  fractional search: search each token for whether matches, then search tokens.
    e.g. rain*→rain, raining, rained, then rain* is first searched in tokens[ ] dict then union(join) of IDs with fields of each text object
Output Use Cases:
  1. Company/Entity specific (like our demo page for after the heatmap airlines
  2. Comparisons: Compare stats for 2 companies

* * *

Input Normalization for Storage & Speed of procesing for each field:
  input_field→tokenize→token2ID[ ]→cache & index ExactMatchEngine
    token[ ]→{entityID, feature, mood}←some fields can be missing
        "Apple Computer Inc"→scoreObj: {EMEVer, ent:IDof (Apple), { }, { }}
        #AppleComputerRocks→scoreObj: {EMEVer, ent:IDof (Apple),"general",±2}
        @AppleComputer→scoreObj: {EMEVer, entID of(Apple),"sourceID",{ }}
    EME versioning is based on data model loaded.
    so scoreObj: {EMEVer1.1, ScoreDateTimestamp, EMEModel_ver2.2,EMERule_that_triggered:'Apple Computer Inc', entID, featureID, moodScore}
        moodscore {floating pointnumber OR 'x' OR 'm' OR 'u'}
            number=moodscore to max 2 decimal prec (e.g. 1.23)e
            x=not scored
            m=mixed
            u=unknown
SlotRulesEngine
    Slot-rules→I love [ID]→{SMEVer1.2_DMVer1.2,ent: ID, "general",+2}
NaiveBayesEngine
    {training}
    "United is the worst airline"→
        {NBEver1.03, DM_Airlines_v1.23, entID,featureID, score}
TagvanaHuman "Engine"
    {TagavanaTester: ID#213, . . . }
CorrectionEngine→"Customer Says So" Overide
    {CME_override, string: {which customer/reason}, score . . . }
Scores
Also version the scores→homomorphic engine passes→e.g. if specific engine (e.g. EME1.23) scores the same input_object it won't change/add any scores.
    Implies: scores have "EME.v123" tag, per score, so an engine can know its "seen this before"
    Implies: don't have duplicate inputs→de-dupe/normalize inputs if same item received from different sources, or redundant crawls.
Advanced Engines
Output Format Examples from Implementation:
SPAM Engine Output Example:
[{'conf': '800',
'engine': 'st:Spamvana',
'entity': 'NP',
'feature': 'st:SPAM',
'fields_used': [{'field': 'Body',
    'field_range_end': 239,
    'field_range_start': 0}],
'model': 'v.1.0.0.1',
'mood_score': 'x',
'rule_hits': 'bayesian rules'}]
Exact Match Engine Output Example:
[{'conf': 1000,
'engine': 'st:EME',
'entity': u'52fc335499c603f475c6a1a0',
'feature': 'NP',
'fields_used': [{'field': 'Body',
    'field_range_end': 186,
    'field_range_start': 181}],
'model': 'v.1.0.0.1',
'mood_score': 'x',
'rule_hits': 'cisco'}, . . . ]
Example input and output data in the format described in the word document.

```
Input:
{
  "input normed":[
    {
      "product":"Extended Stay America",
      "review_date":"2012-07-10 00:00:00",
      "title":"Good new hotel",
      "language":"en",
      "author":"",
      "url":"extendedstay.html",
      "text":"This is not a nice hotel, with all basic amenities. It is located very conveniently in the heart of Leicester and looks brand new. Perfect for a one-night stop. Our room on the first floor was a bit noisy in the early morning because of street cleaning vehicles in the street.",
      "title":"\u201cGood new hotel\u201d",
      "source":"source identifier",
      "provider":"provider name",
      "author_details":{
      },
      "id":"25c911534223dc84dbc267ea8d6d0a8f9ab40478",
      "author_location":"Jersey City, NJ",
      ...
    }
  ]
}
OUTPUT
[
  {
    "engine":"Sentivana",
    "feature":[
      "hotels_motels:Overall"
    ],
    "fields_used":[
      {
        "field":"title",
        "field_range_start":0,
        "field_range_end":16
      },
      {
        "field":"product",
        "field_range_start":"0",
        "field_range_end":"21"
      }
    ],
    "entity":ObjectId("5362e0eac1f0798a480539c6"),
    "mood_score":1.0,
    "model":"v.1.0.0.1",
    "rule_hits":"good:hotel"
  },
  {
    "engine":"Sentivana",
    "feature":[
      "hotels_motels:Overall"
    ],
    "fields_used":[
      {
        "field":"body",
        "field_range_start":0,
        "field_range_end":51
      },
      {
        "field":"product",
        "field_range_start":"0",
        "field_range_end":"21"
      }
    ],
    "entity":ObjectId("5362e0eac1f0798a480539c6"),
    "mood_score":-1.0,
    "model":"v.1.0.0.1",
    "rule_hits":"nice:hotel"
  },
  {
    "engine":"Sentivana",
    "feature":[
```

-continued

```
  "Location"
],
"fields_used":[
  {
    "field":"body",
    "field_range_start":52,
    "field_range_end":130
  },
  {
    "field":"body",
    "field_range_start":"100",
    "field_range_end":"109"
  }
],
"entity":ObjectId("5362e0eac1f0798a4805398d"),
"mood_score":1.0,
"model":"v.1.0.0.1",
"rule_hits":"conveniently:located"
},
{
"engine":"Sentivana",
"feature":[
  "health_fitness:Overall"
],
"fields_used":[
  {
    "field":"body",
    "field_range_start":131,
    "field_range_end":160
  },
  {
    "field":"body",
    "field_range_start":"100",
    "field_range_end":"109"
  }
],
"entity":ObjectId("5362e0eac1f0798a4805398d"),
"mood_score":2.0,
"model":"v.1.0.0.1",
"rule_hits":"perfect:night"
}
]
```

Sentiment/Sentiment Phrase Collection
Entity Collection
Category Keywords Selection for Tagvana
Crawler Conventions (Datavana)

|  |  | http://<br>www.walmart.com | http://<br>forum.thinkpads.com |
|---|---|---|---|
| source |  |  |  |
| id | varchar | www.walmart.com | forum.thinkpads.com |
| name | varchar | walmart | thinkpads |
| type | varchar | reviewsite | forums |
| Case<br>convention: all<br>lower case |  | (Example) | (Example) |

|  |  | product | Brother MFC −9970cdw |
|---|---|---|---|
| id | varchar | brother mfc −9970cdw |  |
| brand | varchar | brother |  |
| family | varchar | mfc |  |
| model | varchar | 9970cdw |  |
| Case convention: all lower case |  | (Example) |  |

|  | author | khtse |
|---|---|---|
| source_id |  | forum.thinkpads.com |
| name |  | khtse |
| location |  | chicago, il |
| type |  |  |
| . . . |  |  |
| Case convention: all lower case |  | (Example) |

|  | review |  |
|---|---|---|
| inserted_at |  | timestamp |
| created_at |  | timestamp |
| source_id |  | (from source table) |
| product_id |  | (from product table) |
| . . . |  |  |

Datavana Data Model

| | |
|---|---|
| URL | indexed |
| METAVANA:SOURCE | embedded |
| METAVANA:AUTHOR | linked |
| METAVANA:TEXT | embedded |
| REVIEW_TIMESTAMP | indexed |
| CRAWL_TIMESTAMP | indexed |
| STAR_RATING | supporting data for analysis/influence/etc . . . can be another field? |
| USEFUL_COUNT | |
| NUMBER OF LIKES | |
| NUMBER OF SHARES/Retweets | |
| ISRETWEETED | |
| ISRETWEET | |
| NUMBER OF COMMENTS | |
| METAVANA:COMMENTS | Review ID ARRAY embedded |
| METAVANA:LOCATION | |
| URL_HASH | duplicate detection |
| ENTRY_HASH | DUPLICATE ENTRY ACROSS WITH DIFFERENT LINK/CAN BE A PROBLEM WITH TWEETS SAME THING CAN BE TWEET BY MANY |
| METAVANA:INDUSTRY ARRAY | embedded |
| METAVANA:SENTIMENT ARRAY | linked to sentiment table |

-continued

| | |
|---|---|
| METAVANA:INFLUENCE | embedded/indexed |
| METAVANA:OVERALL_POLARITY | field |
| METAVANA:SOCIAL_NPS | field |
| Klout Score | indexed |
| BRAND | indexed |
| METAVANA:TEXT | |
| METAVANA:LOCATION | |
| TITLE | indexed |
| ENTRY | full text index |
| PRODUCT/BRAND TITLE | indexed |
| LONG | indexed |
| LAT | indexed |
| CITY | indexed |
| STATE | indexed |
| COUNTRY | indexed |
| METAVANA:SENTIMENT | |
| | |
| _ID | |
| QUOTE | full text index |
| BRAND | indexed |
| CATEGORY | indexed |
| POLARITY | indexed |
| WEIGHT | |
| RECOMMEND SCORE | |
| ENGINE VERSION | indexed |
| METAVANA:AUTHOR | |
| | |
| _ID | |
| NAME | indexed |
| URL | indexed |
| TYPE | indexed |
| LOCATION | indexed |
| METAVANA:INFLUENCE | indexed/linked |
| NUMBER_OF_FOLLOWERS | indexed |
| FOLLOWING | indexed |
| LISTED | indexed |
| JOINED_AT | |
| NUMBER_OF_POSTS | |
| METAVANA:FOLLOWS | linked or embedded to a list of author ids? |
| METAVANA:BRAND_TREE | |
| MODEL | indexed |
| _ID | |
| NAME | indexed |
| METAVANA:FOLLOWS | |
| FOLLOWING | FOREIGN KEY TO THE AUTHOR TABLE? |
| FOLLOWED | |
| METAVANA:SOURCE | |
| | |
| _ID | |
| NAME | indexed     facebook, datasift:facebook, twitter, datasift:twitter metavana normalization |
| URL | indexed |
| TYPE | indexed |
| ISPAID | indexed |
| PAY RATE | |
| ISRESELLABLE | |
| METAVANA:INFLUENCE | |
| INDUSTRY/TOPIC | indexed |
| SCORE | indexed |
| METAVANA:INDUSTRY | |
| NAME | indexed |
| METAVANA:BRAND_TREE ARRAY | |
| FAMILY | indexed |

Data Model Snapshot
Adaptive Sentiment Engine Concepts
Observations, Features, Tools, etc. . . .
    Redundant scoring for confidence on human judgement.
    Automated Rule Learning Algorithm
    Learn generic to specific regular expression (exact strings, types, etc.)
        A variation of WHISK algorithm. (See below)
    Integrate Dictionary API crawling results, WordNet (comes with NLTK in python)

Planning to integrate it with the Automated Rule Learning algorithm and in current engine improvements.

We should look for other languages wordnets. EU has an initiative for all European languages including Turkish.

Use an open source tool for Named Entity Recognition (NLTK, Stanford's NER, GATE, UIUC's named entity tagger): later may be we can build an in-house one.

For keywords suggestions to the user (in case of interactive learning)

We can later design new Survey's for entity recognition will be useful for generic sentiment engines.

Sentiment definition (Current engine ignores sentences such as "very happy!!" as it cannot map this to a category, i.e., no explicit category keyword is present.)

New survey design for tagvana for category prediction
New survey's for sentiment bearing phrases collection
Define what a "piece" means in terms of such phrases.
Keyphrase analysis:
  keyphrase and sentiment bearing phrase relationship learning→keyword mapping, association rules, type relationships, etc.
  keyphrase clustering;
  automatically identifying new categories and category keywords
Made up sentiment words
  #southwestsucks,#ihateapple,#supereasy→can be tagged using Tagvana—>frequency can be a key factor in choosing for tagging)
  Large enough training instance would help the below algorithm to automatically learn these hash tags.
Most of these sentiment bearing hashtags still contain sentiment bearing phrases as substrings without spaces. Using this observation we can automatically discover such phrases and assign the known domain polarity.
  Language agnostic features
  smileys, punctuations (number of question marks, number of exclamations, etc.)
  This might be useful to easily move to the other languages.
Sentiment propagation through network (might be fun to analyze)::: this is useful if the sentiment dictionary is failing to identify the sentiment in a post, while it is able to analyze the sentiment of the neighbors on the same subject.

Output:
Semantic Class: Room=(room|bed|linen|bathroom|pillow|)
Semantic Class Neg=(no|neither|nor|not|dont|do not| . . . )
Semantic Class SENTIMENT_ADJECTIVES: good:1, bad:-1 . . . . . .
Rule ID: 2
Rule: *(Room)*(SENTIMENT_ADJ)*
Output: Sentiments [Category $1, Sentiment Phrase $2, Polarity polarity($2)]

EXAMPLE

Input: Our room was good.
Output: Category Room, Sentiment Phrase good, Polarity 1
Input: The bed was hard to sleep.
Output: Category Room, Sentiment Phrase hard to sleep, Polarity -1
Input: the bathroom was not clean.
Output: Category Room, Sentiment Phrase clean, Polarity 1
Rule ID: 3
Rule: *(Room)*(NEG)*(SENTIMENT_ADJ)*
Output: Sentiments [Category $1, Sentiment Phrase $2, Polarity (-1.0*polarity($2))]

EXAMPLE

Input: Our room was good.
Output:
Input: The bed was hard to sleep.
Output:
Input: the bathroom was not clean.
Output: Category Room, Sentiment Phrase clean, Polarity -1
Algorithm:
Training Data:
  Below is a list of expected had tagged sentiment phrases.

```
{ "piece" : "Beautiful views from our room and from the hotel" , "tags":[ {"category":"Location",
"polarity":"1", "phrase":"view","sentiment_phrase":"beautiful"}]}
{ "piece":"Beautiful views and great service!?.", "tags":[ {"polarity":"1","category":"Customer_Service",
"phrase","service", "sentiment_phrase":"great" }, {"polarity":"1","category":"Location",
"phrase","view", "sentiment_phrase":"beautiful" }]
{"piece":"The hotel was very nice and the staff was extremely helpful and courtious.",
"tags":[{"polarity":"1", "category":"Customer_Service", "phrase":"the staff",
"sentiment_phrase":"extremely helpful and
courtious"},{"polarity":"1","category":"Hotel","phrase":"hotel", "sentiment_phrase":"very nice"}]
{"piece":"American Airlines lost my baggage. #failure.", "tags":[{"polarity":"-
1","category":"Airline_Service","phrase":"American Airlines lost my
baggage.","sentiment_phrase":"#failure"}]}
```

Automated Rule Learning:
Sentiment analysis engine Sentivana, sentiment rules can be defined in terms of regular expressions. In the current engine, most of the rules are keyword and adjective pairs. Regular expression rules are embedded in the java code:
RuleID: 1
Rule: *(room)*(good)*
Output: Sentiments [Category $1, Sentiment Phrase $2, Polarity polarity($2)]

EXAMPLE

Input: Our room was good.
Output: Category room, Sentiment Phrase good, Polarity 1
Input: The bed was hard to sleep.
Output:
Input: the bathroom was not clean.

In Table 1 below, we show the adaptation of the WHISK algorithm (Soderland, 1999) at the high level of the algorithm.

```
Sentivana (TrainingData):
    RuleSet = NULL
    for each piece in TrainingData:
        for each tag of piece:
            if tag is not covered by RuleSet:
                Rule = GrowRule(piece,tag, RuleSet)
                RuleSet.append(Rule)
    Prune(RuleSet)
```

As in WHISK, Sentivana induces rules top-down. Will start from the most general rule and continue adding one term at a time to make it more specific. To select the new term to add to the rule we will use the Laplacian expected error metric as defined in Soderland, 1999. Laplacian=(e+

1)/(n+1), where n is the number of extraction done by the rule and e is the number of errors among those extractions.

Empty Rule: "*(*)*(*)*":: NO NEGATION-->rule

Empty Rule: "*(*)*(*)*(*)*":: WITH NEGATION-->rule wildcard means: skip until the following term is matched. The result Sentivana will start from a seed and an empty rule and anchor the extraction boundaries one slot at a time.

```
GrowRule(Piece, Tag, Training):
    Rule= empty rule (replace terms by wildcards) // or replace \W with
word \P {punc} with punc etc...
    tag_types = {phrase,sentiment_phrase,negation} //
by default for every sentence we will have the negation tag that comes
from the dictionary and/or human tagging
    for tag_type in tags :
        Anchor(Rule, Piece,Tag, Training, tag_type)
    Do until rule makes no error on training or no improvement on
laplacian
        ExtendRule(Rule, Piece,Tag,Training)
        GrowSentimentVocabulary(Rule, Piece,Tag, Training, Tag.polarity,
        Tag.sentiment_phrase)
        GrowCategory(Rule, Piece,Tag, Training, Tag.category, Tag.phrase)
```

```
Anchor(Rule, Piece, Tag, Training, tag_type):
    Candidate1 =Rule + terms just within the extraction of item of
    tag_type
    Test first on the training for the tag_type
    while Candidate1 does not cover Tag:
        ExtendRule(Candidate1, Piece, Tag, Training)
    Candidate2 = Rule + terms just outside of extraction of item of
    tag_type
    while Candidate2 does not cover Tag:
        ExtendRule(Candidate2, Piece, Tag, Training)
    Rule= Candidate1
    if Candidate2 covers more of training data than Candidate1 :
        Rule= Candidate2
```

```
ExtendRule(Rule, Piece,Tag, Training):
    BestRule:Null
    BestL:1.0
    if Laplacian of Rule within error tolerance:
        BestRule =Rule
        BestL=Laplacian of Rule
    For each term in Piece:
        Proposed = Rule+Term
        Test Proposed on Training
        if Laplacian of Proposed < BestL:
            BestRule=Proposed
            BestL=Laplacian of Proposed
    return BestRule
```

```
GrowSentimentVocabulary(Rule, Piece,Tag, Training, polarity,
sentiment_phrase):
    if sentiment_phrase is not in dictionary:
        error = ApplyPolarityRule(Rule,Training, polarity)
        if error is acceptable:
            dictionary.append([sentiment_phrase, polarity])
    find all synonyms from wordnet (or dictionary api) and add to the
dictionary with polarity( may be with a special flag)//this might bring
errors...
            find all antonyms from wordnet (or dictionary api)
and add to the dictionary with -1*polarity //this might bring errors... we
should be tracking these specific cases with more training.
            if sentiment_phrase is in the dictionary with a different polarity:
                Look for negation, sarcasm...
```

```
GrowCategory(Rule, Piece,Tag, Training, category, phrase):
    if category is new:
        Rule = Rule.replace(phrase, "category")
        error = ApplyCategoryRule(Rule,Training, polarity)
        if error is acceptable:
            add category + keyword to the dictionary
            add synonyms to the dictionary
    else: //then we found a new phrase ..
        error = ApplyCategoryRule(Rule,Training, polarity)
        if error is acceptable:
            add keyword to the dictionary of the known category
            add synonyms to the dictionary
```

EXAMPLE

Beautiful views and great service.

Tag: {"polarity":"1","category":"Customer_Service", "phrase","service", "sentiment_phrase":"great"}

For phrase:

Candidate1: * * * (service)//assuming service is not in the Customer_Service Semantic class Candidate2: * * * great (*) @end For sentiment_phrase:

Candidate1: * * * (Sentiment_ADJ)*//assuming great is a known sentiment adjective Candidate2: * * and (*) service @end Pre-pruning and post-pruning the ruleset.

Avoid overfitting+Prune the rules with the expected error greater than a predefined threshold.

Notes:

Problems we are having in the current engine:

1—Missing sentiment (I just bought a Galaxy S3. It's great.) because of missing category keyword in the sentence. In order to avoid this, we will require each piece to be a window of X sentences.

2—Negation rules, by default, each piece will be assumed to have a negation phrase embedded. If human tagged data provides it will be used. If not which might be missing because of data entry mistakes, we can search for the pre-populated negation operators.

Testing/Usage

After the rules are learned/trained by Sentivana, the next step is to decide how we utilize these rules in Sentiment tagging.

EXAMPLE

Let's assume that "Not so beautiful views." matches the below rules:

(NEG)*(Sentiment_ADJ) (Location), −1

* * (Sentiment_ADJ) (Location), +1

(NEG) (Sentiment_ADJ) (Location), −1

(NEG) (Sentiment_ADJ) (Hotel), −1

More specific rules should have higher probability than the more generic rules. Therefore, once the matching rule set is identified, we can find the more specific ones. Even then, we can end up having more than one rule matching. If the rules do not agree on category, all of the categories will be associated with this piece. Two possible approaches to build a new language on a domain:

First Approach:
Build domain rules, sentiment lexicons+category keywords in English following the rules
in How to sign off a vertical with the current engine
Use Tagvana+oDesk+Language consultant to translate rulebase in target Language (Multiple Redundant Scoring)
Use Google translate+babelfish+ . . . to get dictionary translations
Use voting mechanism to select the best matching translation for each rule
Collect reviews in the target language for the specified vertical
Run sentiment engine with the new rulebase on these reviews
Use Tagvana+oDesk+Google translate to measure the accuracy of the engine
Tune rulebase (change distance measure, add/remove new rules)
If accuracy is lower than the threshold GO TO step 6
else vertical+language is ready for consumption
Second Approach:
Translation of rulebase to language L via oDesk
Collect sentiment phrases in Language L with Tagvana (or oDesk),
Collect reviews in target language L and vertical V
Collect training data via Tagvana and oDesk,
Adaptive engine learns the rules by utilizing above collected information
Learn Vertical names, brands, etc in Language L with the help of oDesk and Tagvana
go to step 3 and repeat until accuracy in the expected range.
English vs. Spanish: http://esl.fis.edu/grammar/langdiff/spanish.htm
https://www.sfu.ca/~mtaboada/docs/Brooke_et_al_RANLP_2009.pdf
http://nlp.lsi.upc.edu/freeling/index.php-->sentence splitting, tokenization, lemmatization, spanish dictionary, word sense dictionary.
Components for Servana Architecture
SpamVana
n Source, text are the most important fields.
n Output type:
    {"id":"32984","spam":"true/false"}
StormVana (StreamVana)
Sentivana has to handle storms differently:
Input will have "storm":"true"
Check whether the found sentiment is due to ambiguous known sentiment phrases, if so return neutral or a flag else act as if it is a normal tweet.
SparkVana
"text":" "
"date":" "
{"id":" ",
"score": [{"brand":"brand_B","value_v"}, { }]}
ConfidenceInterval API
input={"vertical":" "
"dtreview":" "}
output={"expected accuracy": 89%, "confidence interval": {"low": 84%, "high": 93%} {
Sentiment Engine Class Definitions
   Mixed (M): A piece that has two sentiments of different polarity belonging to same category.
   Unknown (U): A piece that hits the elimination rules. (May be neutral)
   Not Scored (NS): A piece that contains a word that is not present in the Language Dictionary+Domain specific keyword list.
   Not Scored Known (NSK): A piece that has an adjective from the language that is not included in the domain's rule.
   Neutral (0): A piece that has no adjective from the language or sentiment bearing phrases from the domain rules list.
Statistical Language Processing Link & Info
Useful Resources on Sentiment NLP
http://languagelog.ldc.upenn.edu/nll/?p=3565
http://sentiment.christopherpotts.net/  http://en.wikipedia.org/wiki/Semi-supervised_learning
Survey on Text Analysis Techniques:
http://www.cs.uic.edu/~liub/FBS/Sentiment-Analysis-tutorial-AAAI-2011.pdf
Opinion on Metavana:
http://www.socialmediaexplorer.com/social-media-measurement/metavana-mix-social-complexity-sparkscore-simplicity/
Wordnet: Tagged Corpus at Princeton http://wordnet.princeton.edu/
OpenOffice Thesaurus: Multilingual corpus
Sentiment Analysis (affective word lists):
http://neuro.imm.dtu.dk/wiki/Text_sentiment_analysis#cite_note-18
Python Data Mining/Machine Learning Libraries
Math Basics:
numpy (numpy.scipy.org/): numerical library, matrix computations
scipy (www.scipy.org/):Advanced math, signal processing, optimization, statistics
matplotlib (matplotlib.org): python plotting
Machine Learning:
networkx (networkx.lanl.gov/): graph analysis
pandas(http://pandas.pydata.org/): python data analysis library
NLTK (http://www.nltk.org): Natural language toolkit for python. It provides easy-to-use interfaces to over 50 corporal and lexical resources such as WordNet, along with a suite of text processing libraries for classification, tokenization, stemming, tagging, parsing, and semantic reasoning. It has wrappers for many different machine learning classifier such as mallet, scikit, etc. . . .
MLPY (https://mlpy.fbk.eu/): mlpy provides a wide range of state-of-the-art machine learning methods for supervised and unsupervised problems and it is aimed at finding a reasonable compromise among modularity, maintainability, reproducibility, usability and efficiency.
PyML (http://pyml.sourceforge.net/): PyML is an interactive object oriented framework for machine learning written in Python. PyML focuses on SVMs and other kernel methods. It is supported on Linux and Mac OS X.
Milk (http://pypi.python.org/pypi/milk/): Its focus is on supervised classification with several classifiers available: SVMs (based on libsvm), k-NN, random forests, decision trees. It also performs feature selection. These classifiers can be combined in many ways to form different classification systems.
Shogun (http://www.shogun-toolbox.org/): Code is in C++ but it has a python wrapper.
MDP (http://mdp-toolkit.sourceforge.net/): Python library for data mining includes
PyBrain (http://pybrain.org/): a modular Machine Learning Library for Python
Orange (http://www.ailab.si/orange/): Statistical computing and data mining, Open source data visualization and analysis for novice and experts. Data mining through visual programming or Python scripting PYMVPA (http://www.pymvpa.org/): PyMVPA is a Python package intended to ease statistical learning analyses of large datasets.

scikit-learn (http://scikit-learn.org): Numpy/Scipy/Cython implementations for major algorithms+efficient C/C++ wrappers. This is the one mostly suggested on blogs, question/answer sites.

Monte (http://montepython.net)" a software for gradient-based learning in Python. A simple and easy to manipulate Monte Carlo Markov Chain Rpy2 (http://rpy.sourceforge.net/): Python wrapper for R Pattern (http://www.clips.ua.ac.be/pages/pattern): a web mining module. It includes data retrieval, text analysis (rule-based shallow parser, WordNet interface, syntactical+semantical n-gram search algorithm, tf-idf+cosine similarity+LSA metrics), clustering and classification (k-means, KNN, SVM), and data visualization (graph networks).

Weka (http://www.cs.waikato.ac.nz/ml/weka/): A Java Library which we can access with jython . . . I have used in the past with JAVA.

Natural Language Processing:
  NLTK Stanford Parser's with python interface (this library is in java, but they have provided a socket communication api where python codes can communicate to)

Tagvana User Interface Extensions
Tagvana for Subjectivity Lexicon Collection
  For the initial list of adjectives, adverbs, verbs, nouns, etc., we want to utilize Tagvana to get a statistically valid scores in the [−2,+2] range per vertical.

Suggestion:
  For each item in the dictionary of subjective verbs, find a sample sentence in each vertical and present it to the user for polarity evaluation.

EXAMPLE great
Hotels: The ambiance in the hotel was great. Polarity
Consumer Electronics: It is a great television. Polarity
Tagvana for Sentiment Engine Rule Learning
  Adaptive rule learning approach will utilize a set of tags that are associated with each sentence and review. These tags are brand, category, polarity, sentiment bearing phrase, category keyword, and vertical. We need to design an efficient and effective User Interface to collect this data quickly and accurately. We will need Multiple Redundant Scoring for brand, category, and polarity. Phrases might vary as well.
Tagvana for Keyword Category Mapping
Vertical Signoff Process with Adaptive Engine:
Define the vertical of interest (Erick Watson, Manu Chatterjee, and Brian Lue) Cosmetics, Telecom, Dow Jones, Celebs and Sports
Gather vertical related brand, product, people, etc. . . . keywords. Identify their Twitter handle. (oDesk)
Identify at least one large review source & scrape (clean data for building up initial semantic class of categories) (oDesk people for scraping, Rabia, Brian for categorization, Tagvana people for assigning keywords to category.)
  Use scraped reviews to extract most frequent terms and phrases
    Use a new Tagvana survey to associated this terms with the categories
Collect a few days of Twitter data (Rabia, Ankur to create Twitter Stream using datasift and/or 1% twitter API)
  Use Tagvana to tag these tweets (as a whole) for sentiment and category.
    Training<-Get a set of new training data (get a random sample from the crawled data)
      Collect sentiment and category information for sentiment engine using new survey types.
        Each sentence of a review will be submitted separately for tagging.
Alternatively, we can submit a block of sentences (windowing) instead of one sentence at a time.
      Each sentence will be tagged for sentiment, category, sentiment phrase and category phrase
        Use survey type 2 to collect vertical relevance, polarity, brand, category, and related keywords from training (oDesk/Tagvana people)
      Collected training data will be split into two for training and testing purposes. Training data will be merged with the old training data and rules will be updated accordingly. Data can be split into two different sets randomly.
    Learn rules using Adaptive Engine (Engine, Rabia to QA and evaluate)
      Test accuracy and coverage (Algorithmically computed)
      if accuracy is below expected average (Team to decide if acceptable.)
        collect more training data from other sources
        Use survey type 2 to collect vertical relevance, polarity, brand, category, and related keywords from training (oDesk/Tagvana people)
        go to step 5.a
QA the results on Test data & release (Tagavana/oDesk and Metavana Engineering). Current Engine vertical sign off steps are displayed in the child page of this wikipage.
Automation Steps for the adaptive engine
  Data Collection
  Data collected from Scrapers, Datasift
  Program/script to upload questions to tagvana for different survey types
    3 version of the loaders are there. Another 1-2 might be needed
  Tag collection with Tagvana
  Consume Survey outputs:
  analyze the results of different surveys
  Merge the results of these different surveys
  create knowledge bases in the format of old engine input (if bigram/unigram/trigrams are collected)
  create training.json file for adaptive engine
  submit it to the adaptive engine
Adaptive engine runs and learns new rules
Proposal for data exchange format between Tagvana and Sentivana
Request:

```
<surveys>
    <survey name="survey_name">
        <description> In this survey we will collect polarity of the sentiments.... </description>
        <items vertical="financial-services-qa" type="polarity">
            <item id="1">
```

```
                <piece id="1">
                #RBS seems to struggle to close deals to dispose of assets.
                </piece>
                <piece id="2">
                First, Santander,now HSBC .
                </piece>
                <piece id="3">
                No wonder the share price so low.
                </piece>
            </item>
            <item id="2">
                <piece id="1">
                Lee Brenda in JONESBORO GA hired a local CPA http://t.co/L66Xwnrf
                #Bookkeeper #Accountant #Tax #TaxReturn #IRS #QuickBook
                </piece>
            </item>
        </items>
        <items vertical="kitchen-appliances" type="polarity">
            <item id="1">
                <piece id="1">
                Re: Sponge dough - long with pics.
                </piece>
                <piece id="2">
                Nice bread DJ
                </piece>
            </item>
            <item id="2">
                <piece id="1">
                Re: What's for Dinner Tonight?.
                </piece>
                <piece id ="2">
                Quote from: Amy :-) on October 25, 2012, 11:10:40 AM Of course Katie!!
                </piece>
                <piece id="3">
                That would be awesome!!
                </piece>
                <piece id="4">
                And we can do whatever flavour you want Chocolate is perfect!
                </piece>
            </item>
            ...
        </items>
        <answers>
            <answer type="choice" value="+2"/>
            <answer type="choice" value="1"/>
            <answer type="choice" value="?"/>
            <answer type="choice" value="x">
            <answer type="choice" value="spam"/>
            <answer type="free form" value=""/>
            ...
        </answers>
    </survey>
    <survey name="survey_name2">
        <description>
        Category associations
        </description>
        <items vertical="hotels-motels" type="brand">
            <item id="1">
                <piece id="1">
                Thanks to holiday inn express for my advent Calender 2 kind !!
                </piece>
                <piece id="2">
                http://t.co/d80zG2NG
                <piece>
            </item>
            ....
        </items>
        <answers>
            <answer type="choice" value="Marriott"/>
            <answer type="choice" value="Holiday Inn"/>
            <answer type="choice" value="Holiday Inn Express"/>
        </answers>
    </survey>
</surveys>
```

Response to Surveys

```
<responses>
<response name="survey_name">
<!-- survey name is the identifier for which survey this data was created)-->
<items vertical="financial-services-qa" type="polarity">
<item id="1">
<piece id="1" answer="-1"/>
<piece id="2" answer="0"/>
...
</item>
...
</items>
</response>
<response name="survey_name2">
<items vertical="hotels-motels" type="brand">
<item id="1">
    <piece id="1" answer="Holiday Inn Express"/>
</item>
</items>
</response>
</responses>
```

Item id's are unique to the vertical and survey. Piece id's are unique to the item. Item must have at least one piece. Answers are associated with the pieces.

Assigning Surveys to Users Via Sequel Pro

Select database Tagvana from the databases list.

Look Up for User id (from user table)

Look Up for Survey id (from survey table)

Enter Survey User Permissions into the survey_user_permissions table.

Tagvana API getUserHistory—Returns balance, last payment and answer count for one user params: uid return: {user surveys: [{id, name, questions_answered, payment($/question), survey_status(OPEN/CLOSED), paid (bool), payment_processed_time}]} getUserData—Returns balance, last payment and answer count for one user params: {uid} return: {balance, last_payment, answer_count} getBalances—Returns balances for all users. Do not return user data when paid=earned.

params: — return: {user balances:[{uid, name, address, email, balance}]} getAvailableSurveys params: — return: {surveys: [{name, remaining_questions, payment}]} payUsers—Updated the tagvana DB with payments for users—called when the Excel doc is generated params: {user_payments: [{uid, payment}]} return: — payUser—Update the tagvana DB with payments for a particular user params:
  uid: user id of the user
  sid: survey id for which the payments are made
  admin_uid: admin userid who is making the payment
  payment: amount of the payment return:
  On Success—{"code":"0","description":"success"}
  On Failue—{"code":"10","description":"error"} createUser—create a new user with uid from drupal params: {uid, name, email, address, phone} return: —

Tagvana Database Design

Survey—Top level definition of a survey. One row will be created by the surveyor when questions are generated:
  id
  name
  redundancy_count—how many times each group/question should be answered
  status—active, complete, closed
  exp_date—date this survey expires
  question_count—# of questions
  group_count—# of groups
  payment—amount to be paid per answer
  payment_type—per question or per group Question—each row represents one question. These rows will be generated from the surveyor based on the input XML:
  id
  text—the text of the question
  question_type_id—points to the row that defines this question answers and results types
  group_id—the group this question belongs to
  group_order—where to present the question in the group
  survey_id—the surgery this question belongs to
  meta_data—json data that includes vertical
  is_group_question—boolean determining if this question is for a whole group Question_type—Defines different types of questions, and connects questions to a result_data_table:
1. id
2. question_data—defines what data we are asking in a parable string—e.g. "checkbox=Which Airlines Apply?^Jet Blue, United, AA|radio=Polarity ^-2,-1,0,+1,+2"
3. result_data_table—the table that contains the result data for this question Result—All answered questions:
  id
  user_id—the user that answered this question
  question_id—the id of the question
  group_id—id of the group
  result_data_table—the table that contains the result_data
  result_data_id—the id in the corresponding result_data_<value> table value that contains this result data Result_data—defines the generic types of result_data_tables. This is used when assigning a result_data_table to a question_type. If the data_format is unique to this table, we will create a new row and a new data_result_<value> table
  id
  data_format—The format of this data—e.g. "CB=3, R=1" for three checkbox choices and one radio choice
  result_data_table—the table that contains the result data for this question Result_data_<value>—These tables will contain data for each question_type that exists. Multiple question types may point to the same result_data_<value> if the format is the same—e.g. ""checkbox=Which Airlines Apply?^ Jet Blue, United, AA" v. "checkbox=Which brands apply^Sony^LG^Panasonic"
(Example columns below)
  id
  checkbox_1
  checkbox_2
  checkbox_3
  radio_1
  Group_progress—For tracking the progress of scored groups. A row is added to this table when a users begins scoring a new group with status in_progress. This table used to assign the next group to a users while taking a survey—find lowest group_id for a given survey where count of that group_id<survey.redundancy_count. This table provides the remaining questions pool value in the user dashboard—survey.redundancy_count*survey.question_count—(sum of group_progress.question_count for a survey_id where status=complete OR in_progress). This table can be cleaned of related rows once a survey is complete.
  id
  user_id
  survey_id
  group_id
  question_count—the number of questions in this group
  status—complete, timed out, in_progress
  Survey_complete—used to track which survey's a user has completed. This table should be updated each time a user completes a group.
  user_id
  survey_id
  count—the number of questions answered
  User_payments—used to track the payments provided to the users.
  user_id
  payment_amount
  timelog
  adminuser_user_id
Data we Need from this System
  User Dashboard
    Balance—from survey_complete.count*survey.payment—past payments (from payments table)
    Questions Completed—from survey_complete
    Available Surveys
      Which surveys—from survey
      Questions in pool—from group_progress
    Answer analysis
    ??
_OLD_
italic=indexed
user—
  id
  first name
  last name
  email
  level (admin|tester)
  total_earned—incremented upon survey completion OR use SELECT SUM(payment) from user_survey where user_id=<id> AND status='complete'
  total_paid—incremented when invoice is sent OR use SELECT SUM(total_payment) from invoice where user_id=<id>AND status='paid'
  engine_deviation—array for verticals
  user_deviation—array for verticals
  country
  timezone
  address
  phone
qa_input—pieces pulled from datavana.
  id
  review_id
  sentence_id
  sentence
  brand
  vertical
  datetime
  survey_id—The survey this piece belongs to
  multiplicity—from the survey
  answered_count—incremented when this piece is answered
survey—defines what data should be pulled from datavana, and tracks the usage of this survey by users.
  id
  name—E.g. Airlines for week of 12/3
  description
  vertical
  multiplicity—how many users should take this survey
  started_count—incremented when a user start this survey
  completed_count—incremented when user completes this survey
  status [ongoing|pending_complete|complete]—set to pending_complete when checkedout_count==multiplicity. set to complete when completed_count==multiplicity. Indexed to quickly populate user dashboard
  item_payment—$ per item
  user_criteria (deferred)—what trainings, language, proficiencies, etc are required for users to take this survey
  data_criteria (deferred)—what data should this survey pull from datavana
  timeout—time from checked out when survey is considered abandoned (perhaps global value?)
user_survey—represents a survey taken by a user. created when user begins a new survey.
  id
  user_id—indexed for user stats generation
  survey_id—indexed for survey analytics
  datetime_created
  datetime_completed
  status [completed|abandoned|started]—set to abandoned when survey.timeout is exceeded
  payment—amount paid for this survey, set when completed
  invoice_id—points to the invoice this appear payment appears on. Indexed to generate invoices
qa_output—raw scoring data for all users. Might add indexed user_id and/or survey_id columns depending on analytics requirements
  id
  user_survey_id—connects this output to a user and survey
  score—JSON array of {polarity,vertical,category, tags}. Each array element represent possible vertical. Parsing this JSON for analytics will be SLOW, perhaps change to columns
invoice—create new invoice if a new user_survey is created and no invoice exists with status pending for that user.
  id
  user_id
  date
  total_payment
  status (paid|pending)—set to pending on creation and paid when invoices are sent user_training—create a new record when a user begins a new training
  user_id
  training_id
  score
  datetime_created
  datetime_completed
  status (started|completed|abandoned)
training—defines a training
  id
  vertical
  description
  prerequisites?
  questions?—JSON Array
timeout—time from start when training is considered abandoned (perhaps global value?)
Tagvana Requirements
Homepage
  Login
  Change Password
  Basic info page
Admin Features
  Outstanding payments table
  Columns: user name, paypal email, amount, (checkbox for include in report)
  Generate Report button
  User table (iFrame)
  Columns: User name, Email, Total earned, Surveys completed, total questions answered, unpaid balance, delete user button
  Survey Table (iFrame)
  Survey name, questions, redundancy, open date, Date Complete (blank if open),?? (what else)
  Add user interface
  Name
  email
  address
  phone
  timezone
  role (survey admin, survey user)
User Features
4. View Help
5. Send feedback (email link)
6. History Table
  Columns: Survey name,Questions answered,$ per question, Earned, Date Complete (blank if open), Paid(checkbox)
  Last row shows totals
7. Available Survey's
  Columns: Survey name, $ per question, Take Survey button
8. Editable Profile details
  Name
  email
  Address
  Phone
  Timezone
9. Change Password
10. Payment Details
  Paypal email address
11. Logout
See view UI mockups here
https://moqups.com/nathanielwolf/Wh8PUymV
Tagvana Survey Load Instructions
  Create an entry in the survey table. Get the survey ID
  For each review(Item)
  create a group_id in group review table.

Note the group id, and create entry(ies) in the qa_input table with that group id. (The order of group id is important so as every group's pieces should be inserted before inserting any bigger group_id's pieces)

When step 2 is finished for all groups, get the group_count and input_piece count and update the survey row in the survey table.

Make the survey ACTIVE.

Tagvana UI Queries

```
CREATE TABLE 'user' (
  'id' int(16) NOT NULL AUTO_INCREMENT,
  'username' varchar(64) DEFAULT '',
  'password' varchar(32) DEFAULT '',
  'level' varchar(64) DEFAULT '',
  'name' varchar(256) DEFAULT NULL,
  'email' varchar(128) DEFAULT NULL,
  'address' varchar(2048) DEFAULT NULL,
  PRIMARY KEY ('id'),
  UNIQUE KEY 'email' ('email')
) ENGINE=InnoDB DEFAULT CHARSET=utf8;
```

```
CREATE TABLE 'user_payments' (
  'id' int(16) unsigned NOT NULL AUTO_INCREMENT,
  'user_id' int(16) NOT NULL,
  'survey_id' int(11) NOT NULL,
  'payment_amount' float DEFAULT '0',
  'admin_user_id' int(16) DEFAULT NULL,
  'timelog' timestamp NOT NULL DEFAULT CURRENT_TIMESTAMP,
  PRIMARY KEY ('id'),
  KEY 'user_id' ('user_id','survey_id')
) ENGINE=InnoDB DEFAULT CHARSET=utf8;
```

```
DELIMITER $
CREATE PROCEDURE next_sentences(IN s_id INT,IN u_id INT,
IN rCount INT, IN groupId INT)
BEGIN
DECLARE g_id INT;
IF groupID = 0 THEN
    select group_id INTO g_id from qa_input where survey_id =
    s_id and qa_input.group_id > IFNULL((select group_id from
    survey_complete where user_id =u_id and survey_id = s_id),0)
    and processing < rCount order by qa_input.id limit 1;
ELSE
    select group_id INTO g_id from qa_input where survey_id = s_id
and
    qa_input.group_id > groupId and processing < rCount order by
    qa_input.id limit 1;
END IF;
update qa_input set processing=processing+1 where group_id = g_id;
SELECT * from qa_input where group_id = g_id order by sentence_id;
END
$
DELIMITER ;
```

Glossary

Item—A single piece of text, which may come from a review, a tweet, etc.

Item Score—A combined score of all the Piece Scores. Many different types of item scores are possible depending on how the Piece Scores are weighted.

Magnitude Item Sentiment Score—Sentiment Scoring where each Item is scored based on the sum of the Piece scores. Pieces, which are not scored or scored as Mixed or Unknown, are treated as 0.

Mapped Item Sentiment Score—A complex scoring method where Piece-Rules (not covered in this whitepaper) map to a single Item level sentiment score.

Piece—a subset of an item, which can be an atomic piece of measurable sentiment. In general, we have humans (and the engine) score Pieces.

Piece Score—a single piece is be attributed a sentiment on the scale of {−2, −1, 0, +1, +2}

If the item is not sentiment score-able by a human it can be scored as

Mixed {M}—has elements of positive or negative sentiment

Unknown {U}—a human doesn't know how to score the item, which can happen for:
unknown words or phrases
Odd language format
Corrupted data
nonsensical grammar Not Scored {X}—either skipped or has some other reason that the human did not score the item.

Sentiment—A passage of text containing emotion

Stream—A set of items (e.g. a days worth of reviews at Yelp, or 10,000 Twitter tweets).

Stream Score—an aggregated number of Item Scores combined to form a measurement of a stream during a certain query period.

User—Person who purchases the product and keeps shareholders happy.

Window (or Epoch)—A set period of time during which a Stream is examined. This can be a minute or an hour, or a week etc. For example when we publish a graph of a given score vs time we can choose different time scales such as 1-minute resolution, 1-hour resolution, 2.5 day resolution, 1-week resolution etc.

Windowing Effect—As the time scale (Epoch) gets longer fast changing events in a Stream are more difficult to see because they get smoothed out by the length of the time window examined. This effect of smoothing vs window length is called the "windowing" effect in signal processing and informatics theory. Many different valid approaches for dealing with windowing are possible depending on the type of information preservation desired.

Example Embodiments

Figure 17:
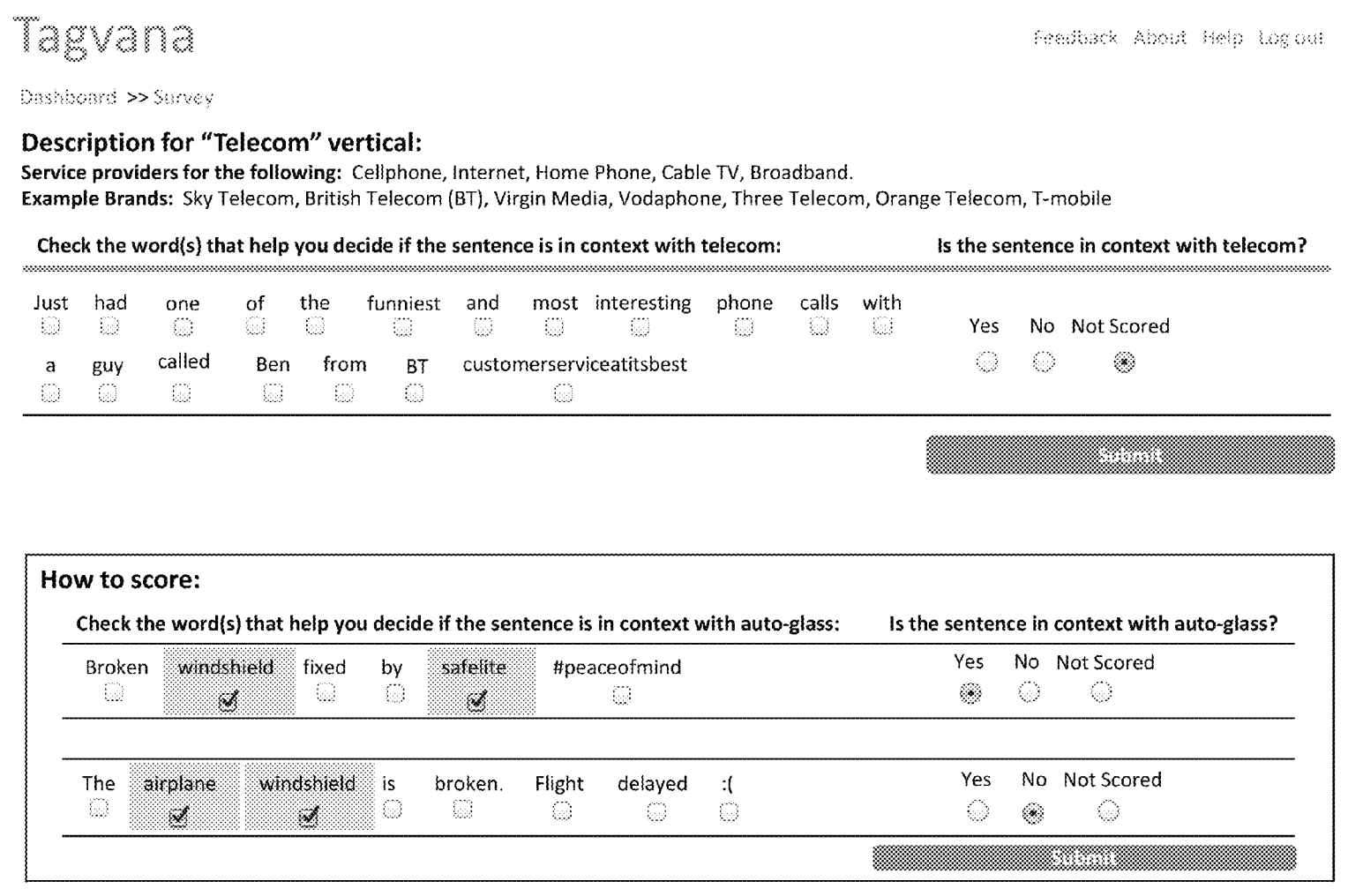

FIG. 15 illustrates an example of the Tagvana dashboard showing the survey taker's name, information about how much they have earned, been paid, and the number of questions they have taken. Also shown are the surveys that they can take as well as their payment history. FIG. 16 is an example of a survey for scoring the sentiment of sample text where −2 is very negative and +2 is very positive in emotion. FIG. 17 is type of survey for identifying the words in sample text that signal whether or not the sample text is relevant or not relevant to a reference topic. FIG. 18 is a figure that has example survey questions showing several comments for a cosmetics product. On the left hand side, the phrase is broken into words with checkboxes below each word. You pick the words that make you believe that the phrase has sentiment. On the right hand side, you are asked to decide polarity and intensity of the feeling of the sentence. You also can check the "Spam" or "Chaff" boxes if the phrase is an promotion/ad or if it is not readable or understandable to a person. FIG. 19 illustrates two sample surveys for generating the training data for Tagvana Survey's-1(Sentiment/Entity Collection). One question helps determine the polarity and sentiment of a given sentence. A second question identifies whether or not there is an entity.

Objects and Advantages

New Tagvana Survey

To feed our semi-supervised learning algorithm for sentiment extraction we have invented a new type of survey. This survey can be used to collect different aspects of a sentence/review in an iterative fashion. In one iteration we would tag if the sentence/review/tweet (item) is relevant to the topic under consideration and if so which words in this item are relevant to the vertical and which are not relevant. Same survey with a different question and tag choices could be used to collect if the items are sentiment bearing. Then:

1. This survey is used to tag each review/tweet/sentence with a sentiment polarity.
2. This survey is used to tag each word/keyword/keyphrase in these sentences relevancy in terms of sentiment bearing. If a word is sentiment bearing then it will be checked as relevant and otherwise it will be ignored.

In addition, a different question and a set of new tag choices can be made to collect the opinion targets and features/aspects of brands/entities in a given vertical. Each sentence will be tagged if they contain any feature related phrase and if so, the keywords that describe this feature will be tagged as relevant.

For instance if the tagged sentence was: "The carpet in the room was dirty". The first survey will help us if this sentence can be seen in the context of hotels-motels. The second survey will be used to tag the same sentence with a "negative sentiment" and the "dirty" or "was dirty" or any other combinations of the words in the sentence will be tagged as sentiment bearing phrase. One would expect that the taggers will tag this sentence as negative due to the presence of "dirty" adjective.

The last type of the survey will be used to the target of the sentiment phrase (opinion bearing phrase). For this example, we would expect that the taggers/survey takers will tag the "the carpet in the room" as the phrase identifying the opinion targets.

Figure 13:
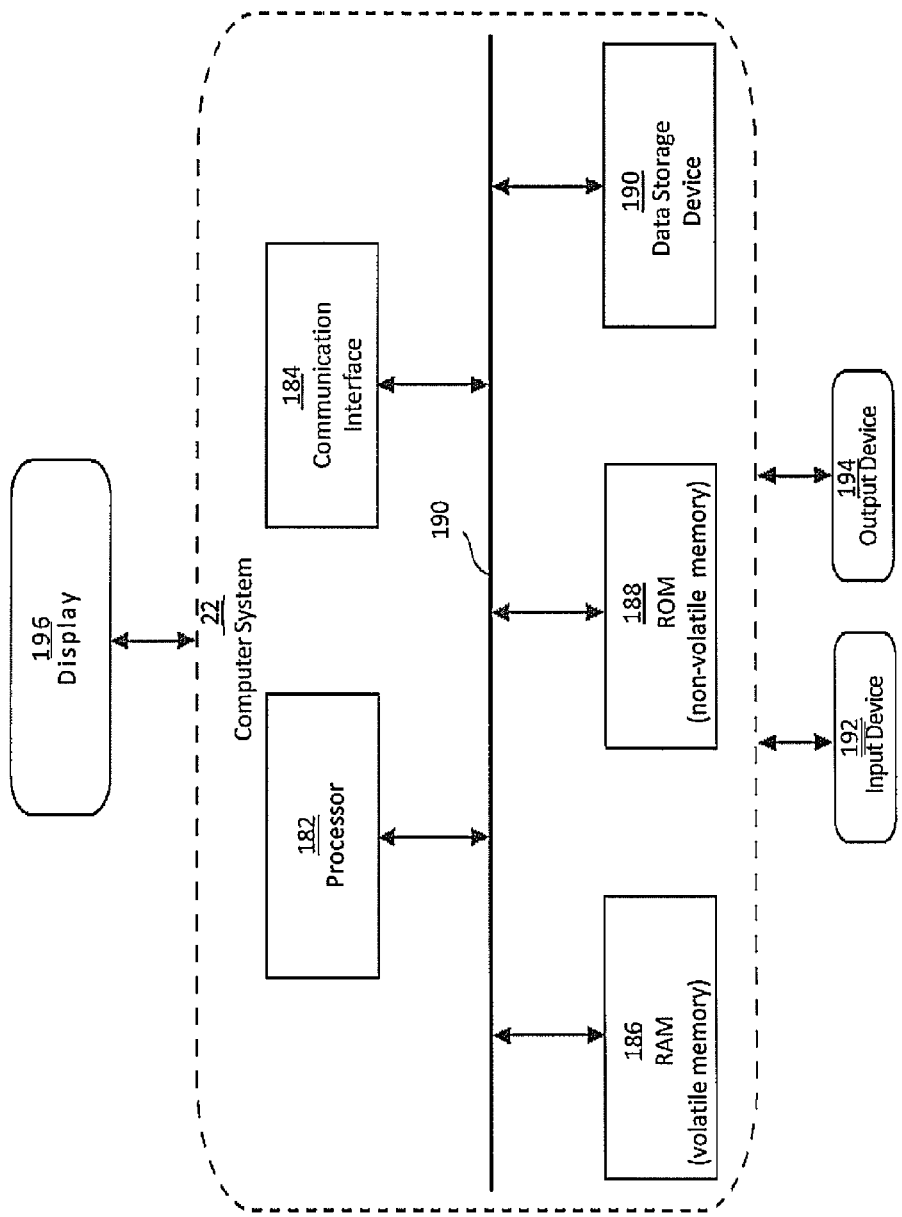
FIG. 13 is a block diagram illustrating an example of a computer device on which computer-executable instructions to perform the methodologies discussed herein may be installed and run

FIG. 13 is a block diagram of a machine in the example form of a computer system 160 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment or as a peer machine in a peer-to-peer (pr distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computer system 22 includes a processor 182 (e.g., a central processing unit (CPU), a graphics processing unit (GPU) or both), and memory 186, which communicate with each other via bus 190. Memory 186 includes volatile memory devices (e.g., DRAM, SRAM, DDR RAM, or other volatile solid state memory devices), non-volatile memory devices (e.g., magnetic disk memory devices, optical disk memory devices, flash memory devices, tape drives, or other non-volatile solid state memory devices), or a combination thereof. Memory 186 may optionally include one or more storage devices remotely located from the computer system 22. The computer system 22 may further include video display unit 196 (e.g., a plasma display, a liquid crystal display (LCD) or a cathode ray tube (CRT)). The computer system 22 also includes input devices 192 (e.g., keyboard, mouse, trackball, touchscreen display, etc.), output devices 194 (e.g., speakers), and a network interface device 184. The aforementioned components of the computer system 22 may be located within a single housing or case. Alternatively, a subset of the components may be located outside of the housing. For example, the video display unit 196, the input devices 192, and the output device 194 may exist outside of the housing, but be coupled to the bus 190 via external ports or connectors accessible on the outside of the housing.

Memory 186 includes a machine-readable medium on which is stored one or more sets of data structures and instructions (e.g., software) embodying or utilized by any one or more of the methodologies or functions described herein. The one or more sets of data structures may store data. Note that a machine-readable medium refers to a storage medium that is readable by a machine (e.g., a computer-readable storage medium). The data structures and instructions may also reside, completely or at least partially, within memory 164 and/or within the processor 182 during execution thereof by computer system 22, with memory 186 and processor 186 also constituting machine-readable, tangible media.

The data structures and instructions may further be transmitted or received over a network 180 via network interface device 174 utilizing any one of a number of well-known transfer protocols HyperText Transfer Protocol (HTTP)). Network 180 can generally include any type of wired or wireless communication channel capable of coupling together computing nodes (e.g., the computer system 160). This includes, but is not limited to, a local area network, a wide area network, or a combination of networks. In some embodiments, network includes the Internet Certain embodiments are described herein as including logic or a number of components, modules, or mechanisms. Modules may constitute either software modules (e.g., code and/or instructions embodied on a machine-readable medium or in a transmission signal) or hardware modules. A hardware module is a tangible unit capable of performing certain operations and may be configured or arranged in a certain manner. In example embodiments, one or more computer systems (e.g., the computer system 22) or one or more hardware modules of a computer system (e.g., a processor 182 or a group of processors) may be configured by software an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 182 or other programmable processor) that is temporarily configured by software to perform certain operations. It will be appreciated that the decision to implement a hardware module mechanically, in dedicated and permanently, configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 162 configured using software, the general-purpose processor 182 may be configured as respective different hardware modules at different times. Software may accordingly configure a processor 162, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 182 that are temporarily configured (e.g., by software, code, and/or instructions stored in a machine-readable medium) or permanently configured to perform the relevant operations. Whether temporarily or permanently configured, such processors 182 may constitute processor-implemented (or computer-implemented) modules that operate to perform one or more operations or functions. The modules referred to herein may, in some example embodiments, comprise processor-implemented (or computer-implemented) modules.

Moreover, the methods described herein may be at least partially processor-implemented (or computer-implemented) and/or processor-executable (or computer-executable). For example, at least some of the operations of a method may be performed by one or more processors 182 or processor-implemented (or computer-implemented) modules. Similarly, at least some of the operations of a method may be governed by instructions that are stored in a computer readable storage medium and executed by one or more processors 182 or processor-implemented (or computer-implemented) modules. The performance of certain of the operations may be distributed among the one or more processors 162, not only residing within a single machine, but deployed across a number of machines. In some example embodiments, the processors 1002 may be located in a single location (e.g., within a home environment, an office environment or as a server farm), while in other embodiments the processors 182 may be distributed across a number of locations.

While the embodiment(s) is (are) described with reference to various implementations and exploitations, it will be understood that these embodiments are illustrative and that the scope of the embodiment(s) is not limited to them. In general, the embodiments described herein may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The terms "a" or "an," as used herein, are defined as one or more than one. The term "plurality," as used herein, is defined as two or more than two. The term "another," as used herein, is defined as at least a second or more.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and its practical applications, to thereby enable others skilled in the art to best utilize the embodiments and various embodiments with various modifications as are suited to the particular use contemplated.

What is claimed and desired to be secured by Letters Patent of the United States is:

1. A computer-implemented-method for analyzing sentiment bearing documents in a hybrid system, comprising:
    sampling a document from the database according to a predetermined selection criteria;
    tagging each sample document from the sample documents, each document having one or more pieces of text;
    presenting each piece in the document to a group of humans, each human scoring a different attribute associated with an inquiry from the hybrid system;
    determining whether the responses from the group of humans for each attribute collectively meet a predetermined threshold;
    storing an aggregated score if there is a human agreement from the group of humans for a particular attribute; and
    providing an aggregated score as a feedback to a machine learning system for adaptive adjustment of a model associated with the machine learning system for automatic tagging of unsampled documents.

2. The method of claim 1, wherein the aggregated score comprises a piece level score aggregation.

3. The method of claim 1, wherein the aggregated score comprises an item level score aggregation.

4. The method of claim 1, wherein the aggregated score comprises stream level score aggregation.

5. The method of claim 1, further comprising data processing to tag unsampled documents using the model in the machine learning system.

6. The method of claim 1, wherein the piece comprises a keyword, a phrase, a sentence, or a paragraph.

7. The method of claim 1, wherein the unsampled data comprises raw data, historical data, and new data.

8. The method of claim 1, wherein the documents comprises social media posts, electronic messages and speech-to-text messages.

9. The method of claim 1, wherein the one or more attributes comprises a spam type, a category types, an industry type, and a sentiment magnitude.

10. The method of claim 1, wherein the threshold comprises a number and a weighted value.

11. A hybrid system for analyzing sentiment bearing documents, comprising:
    a sampling component configured to sample documents from the database according to a predetermined selection criteria;
    a tagging component configured to tag each sample document from the sample documents, each document having one or more pieces of text, the tagging component configured to present each piece in the document to a group of humans, each human scoring a different attribute associated with an inquiry from the hybrid system;
    a score aggregation module configured to determine whether the responses from the group of humans for each attribute collectively meet a predetermined threshold, the score aggregation module configured to receive an aggregated score if there is a human agreement on a particular attribute; and
    a machine learning module configured to receive an aggregated score as a feedback adaptively adjustment of a model associated with the machine learning module for automatic tagging of unsampled documents.

12. The system of claim 11, further comprising a data processing module configured to tag unsampled documents using the model in the machine learning module.

13. The system of claim 11, wherein the aggregated score comprises a piece level score aggregation.

14. The system of claim 11, wherein the aggregated score comprises an item level score aggregation.

15. The system of claim 11, wherein the aggregated score comprises stream level score aggregation.

16. The system of claim 11, wherein the piece comprises a keyword, a phrase, a sentence, or a paragraph.

17. The system of claim 11, wherein the unsampled data comprises raw data, historical data, and new data.

18. The system of claim 11, wherein the documents comprises social media posts, electronic messages and speech-to-text messages.

19. The system of claim 11, wherein the one or more attributes comprises a spam type, a category types, an industry type, and a sentiment magnitude.

20. The method of claim 11, wherein the threshold comprises a number and a weighted value.

* * * * *